United States Patent
Ivanov et al.

(10) Patent No.: US 9,141,113 B1
(45) Date of Patent: Sep. 22, 2015

(54) PROBABILISTIC SURFACE CHARACTERIZATION FOR SAFE LANDING HAZARD DETECTION AND AVOIDANCE (HDA)

(75) Inventors: Tonislav I. Ivanov, Los Angeles, CA (US); Andres Huertas, Woodland Hills, CA (US); Andrew E. Johnson, Glendale, CA (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 819 days.

(21) Appl. No.: 13/456,451

(22) Filed: Apr. 26, 2012

(51) Int. Cl.
  *G05D 1/00* (2006.01)
  *G05D 1/06* (2006.01)
  *G01S 13/94* (2006.01)

(52) U.S. Cl.
  CPC .............. *G05D 1/0676* (2013.01); *G01S 13/94* (2013.01)

(58) Field of Classification Search
  CPC .... G05D 1/0676; G05D 1/0202; G01S 5/163; G01S 13/94; G01S 13/9005; B64G 2001/1064
  See application file for complete search history.

(56) References Cited

U.S. PATENT DOCUMENTS

| | | | |
|---|---|---|---|
| 5,867,804 A | 2/1999 | Pilley et al. | |
| 6,006,158 A | 12/1999 | Pilley et al. | |
| 6,154,143 A | 11/2000 | Robinson | |
| 6,167,144 A * | 12/2000 | Nishiguchi et al. | 382/108 |
| 6,182,005 B1 | 1/2001 | Pilley et al. | |
| 6,195,609 B1 | 2/2001 | Pilley et al. | |
| 6,314,363 B1 | 11/2001 | Pilley et al. | |
| RE38,584 E | 9/2004 | Robinson | |
| 6,952,632 B2 * | 10/2005 | Robert et al. | 701/16 |
| 7,248,342 B1 | 7/2007 | Degnan | |
| 7,711,157 B2 | 5/2010 | Duong et al. | |
| 7,856,312 B2 | 12/2010 | Coombes et al. | |
| 7,961,301 B2 | 6/2011 | Earhart et al. | |
| 7,967,255 B2 | 6/2011 | Head et al. | |
| 7,979,205 B2 | 7/2011 | Coombes et al. | |
| 8,509,965 B2 * | 8/2013 | Lin | 701/3 |
| 2003/0083804 A1 | 5/2003 | Pilley et al. | |
| 2004/0225432 A1 | 11/2004 | Pilley et al. | |
| 2006/0136126 A1 | 6/2006 | Coombes et al. | |
| 2007/0279615 A1 | 12/2007 | Degnan et al. | |
| 2008/0023587 A1 | 1/2008 | Head et al. | |
| 2009/0116747 A1 | 5/2009 | Duong et al. | |
| 2009/0306840 A1 * | 12/2009 | Blenkhorn et al. | 701/16 |
| 2010/0157736 A1 | 6/2010 | Riordan et al. | |

(Continued)

OTHER PUBLICATIONS

"Evidential Terrain Safety Assessment for a Planetary Lander," N. Serrano, A. Quivers, and M. Bajracharya, http://www-robotics.jpl.nasa.gov/publications/Navid_Serrano/ISAIRAS08.pdf (accessed Sep. 16, 2011).

(Continued)

*Primary Examiner* — Brian M O'Hara
(74) *Attorney, Agent, or Firm* — Mark Homer

(57) ABSTRACT

Apparatuses, systems, computer programs and methods for performing hazard detection and avoidance for landing vehicles are provided. Hazard assessment takes into consideration the geometry of the lander. Safety probabilities are computed for a plurality of pixels in a digital elevation map. The safety probabilities are combined for pixels associated with one or more aim points and orientations. A worst case probability value is assigned to each of the one or more aim points and orientations.

10 Claims, 18 Drawing Sheets

(56) References Cited

U.S. PATENT DOCUMENTS

| | | |
|---|---|---|
| 2010/0208244 A1 | 8/2010 | Earhart et al. |
| 2011/0051121 A1 | 3/2011 | Degnan et al. |
| 2011/0074783 A1 | 3/2011 | Coombes et al. |

OTHER PUBLICATIONS

"Determination of Terminal Landing Footprint for On-Board Terrain Assessment and Intelligent Hazard Avoidance," Scott R. Ploen, Charles E. Kinney, and Homayoun Seraji, http://trs-new.jpl.nasa.gov/dspace/bitstream/2014/7449/1/03-1322.pdf (accessed Sep. 16, 2011).

"Passive Imaging Based Multi-cue Hazard Detection for Spacecraft Safe Landing," Andres Huertas, Yang Cheng, and Richard Madison, http://trs-new.jpl.nasa.gov/dspace/bitstream/2014/39270/1/05-3257.pdf (accessed Sep. 16, 2011).

"Automatic Hazard Detection for Landers," Andres Huertas, Yang Cheng and Larry H. Matthies, http://trs-new.jpl.nasa.gov/dspace/bitstream/201/41368/1/07-4233.pdf (accessed Sep. 16, 2011).

"Lidar Systems for Precision Navigation and Safe Landing on Planetary Bodies," Farzin Amzajerdian, Diego Pierrottet, Larry Petway, Glenn Hines, and Vincent Roback, http://ntrs.nasa.gov/archive/nasa/casi-ntrs.nasa.gov/20110012163_2011012604.pdf (accessed Sep. 16, 2011).

"Autonomous Precision Landing and Hazard Avoidance Technology (ALHAT) Project Status as of May 2010," Scott A. Striepe, Chirold D. Epps, and Richard A. Robertson, http://www.planetaryprobe.eu/IPPW7/proceedings/IPPW7%20Proceedings/Papers/Session7A/p457.pdf (accessed Sep. 16, 2011).

\* cited by examiner

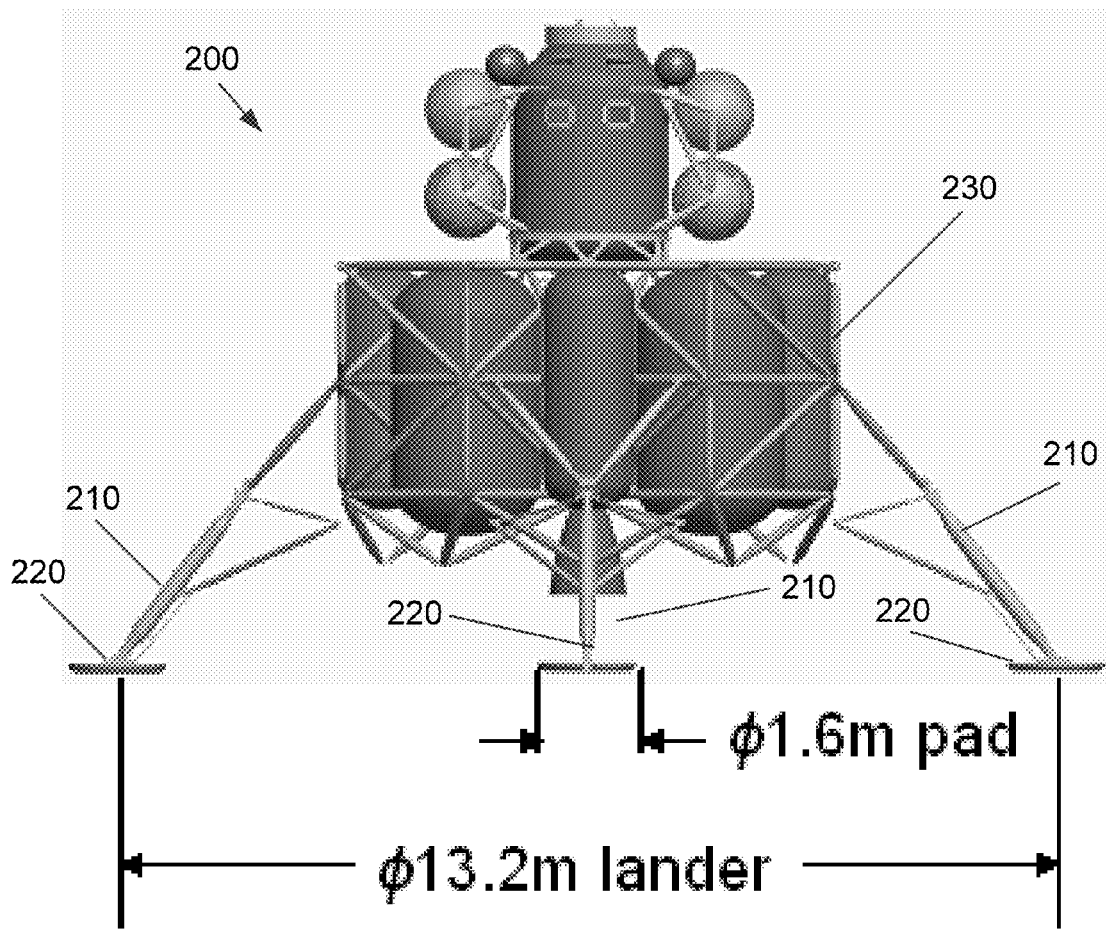

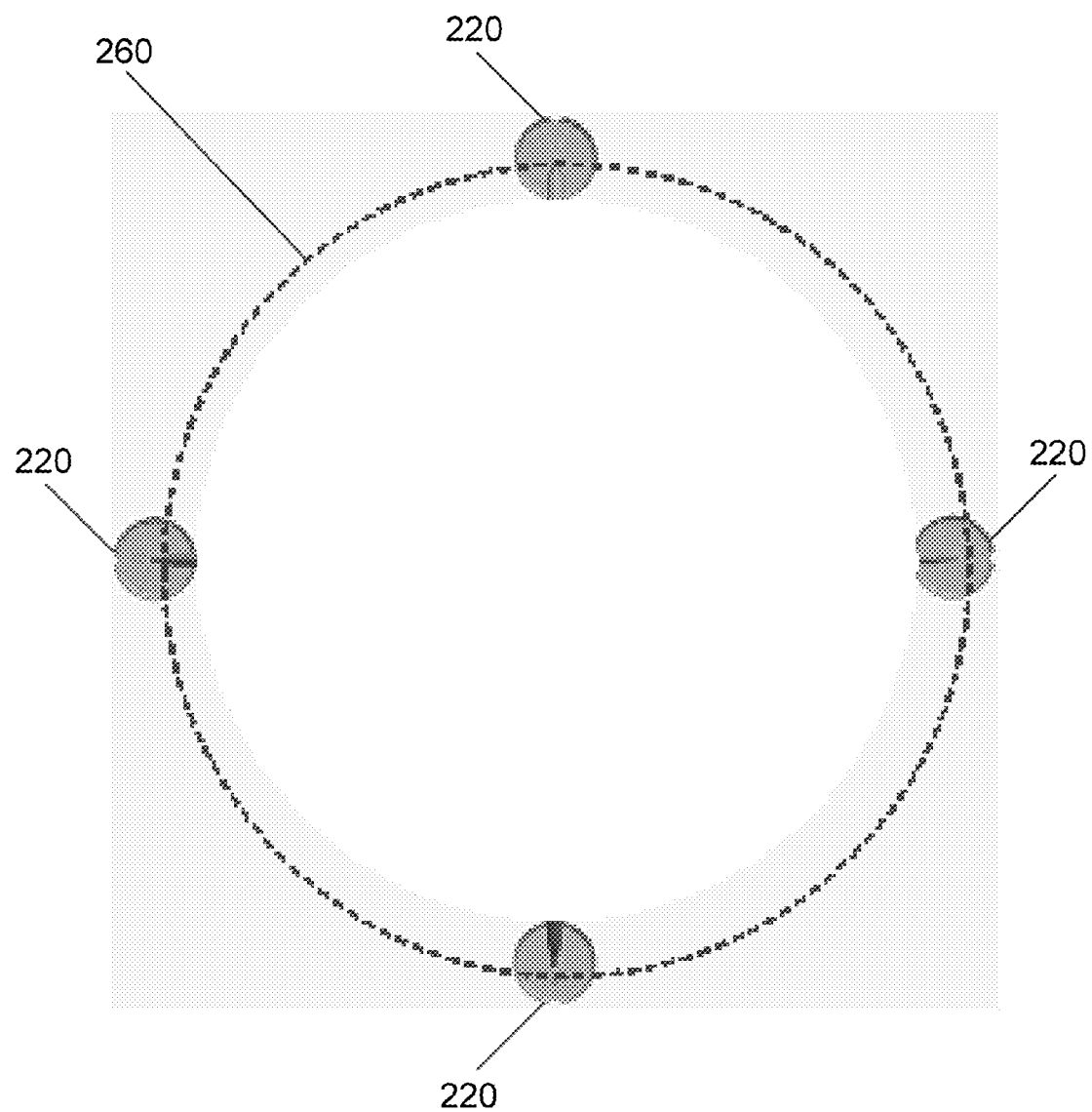

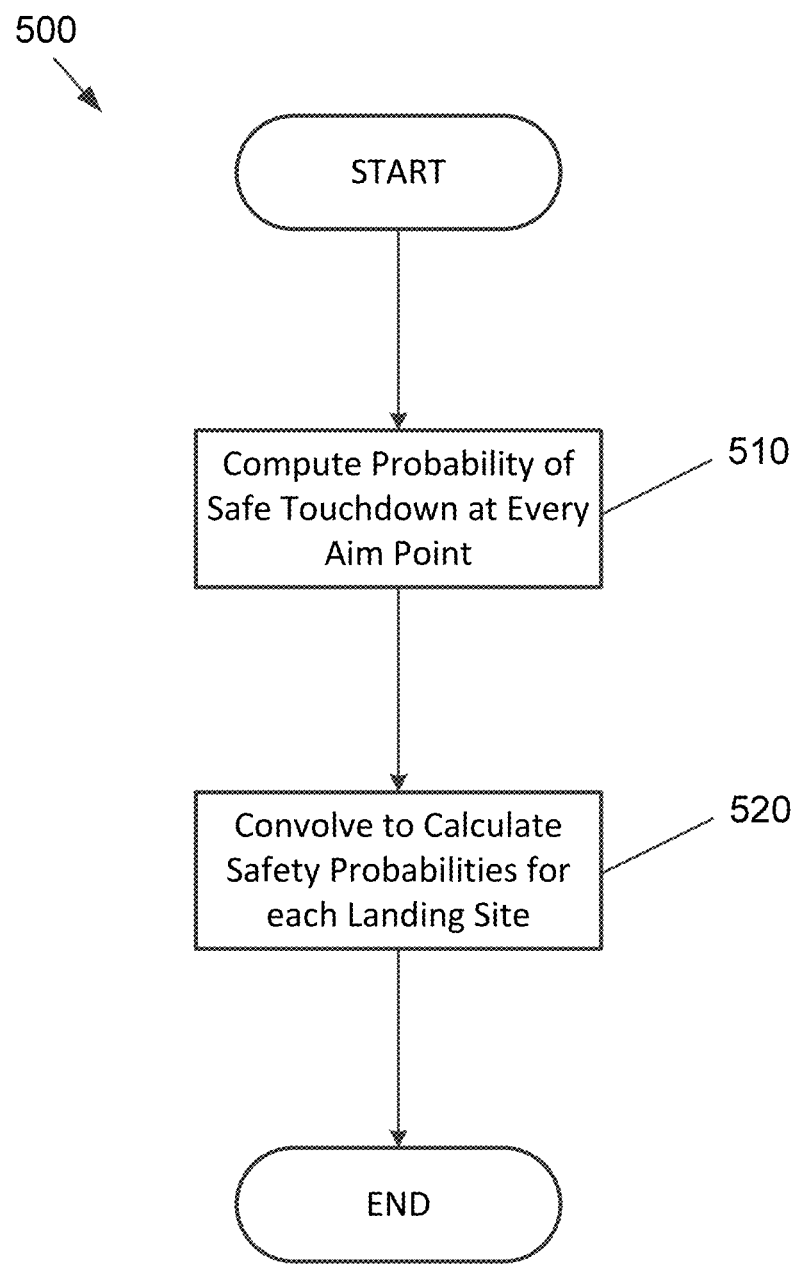

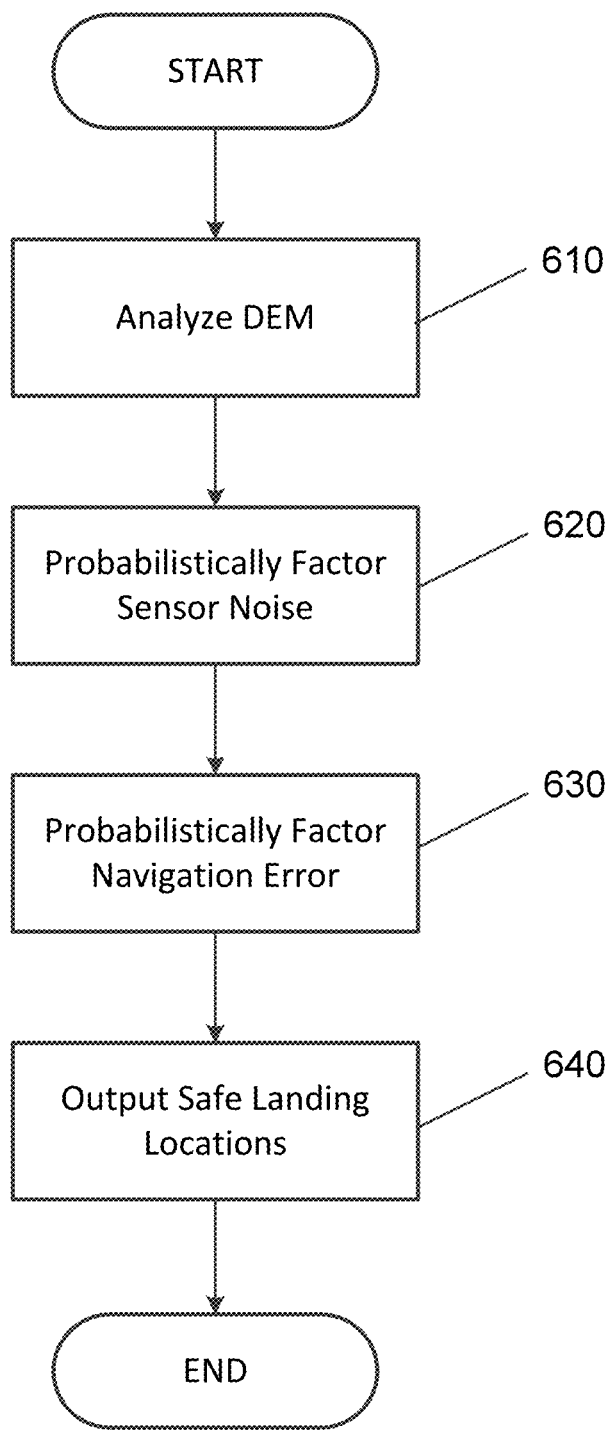

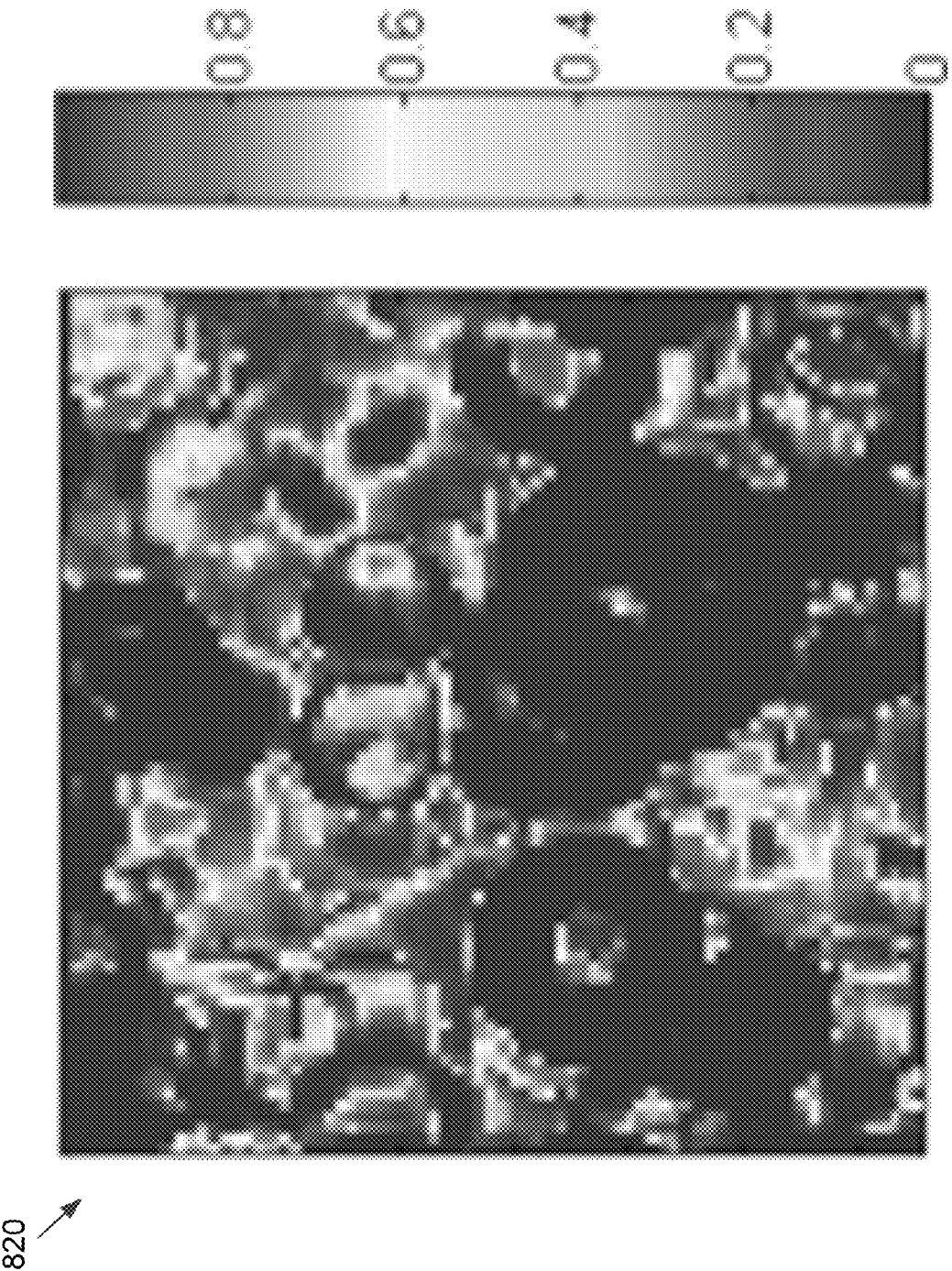

PROBABILISTIC SURFACE CHARACTERIZATION FOR SAFE LANDING HAZARD DETECTION AND AVOIDANCE (HDA)

ORIGIN OF THE INVENTION

Embodiments of the present invention described herein were made in the performance of work under NASA contract and are subject to the provisions of Public Law #96-517 (35 U.S.C. §202) in which the Contractor has elected not to retain title.

FIELD

The present invention generally relates to autonomous hazard detection and avoidance (HDA), and more particularly, to using a probabilistic approach to HDA that accounts for sensor noise in order to identify safe landing sites for aircraft or spacecraft in a given area.

BACKGROUND

Conventional approaches that have been developed to characterize landing hazards in real-time generally involve using simple landing spacecraft models and the setting of thresholds to accommodate noise issues in hazard assessment. For example, the lidar-based Terrain Sensing and Recognition Algorithms (TSAR) developed for the Autonomous Landing Hazard Avoidance Technology (ALHAT) Project represented the lander by a planar patch (denoted Vehicle Footprint Dispersion Ellipse (VFDE)) equivalent to the diameter of the lander plus a measure of navigation error. The VFDE typically spans about 20 meters for an Altair class, 15 meter diameter, lunar lander.

Also, such earlier approaches require setting a number of detection thresholds in order to determine what sensed surface features correspond to surface hazards. Thresholds are typically determined by sandbox analyses and by Monte Carlo simulations. Since the approaches perform binary classification of terrain using thresholds, these approaches are deterministic (i.e., non-probabilistic) in nature. Such non-probabilistic approaches, however, fail to provide a robust method to detect hazards in the presence of sensor noise. The conventional methods require setting thresholds conservatively in order to avoid missing hazards (false negatives), but at the expense of introducing false alarms (false positives), thus significantly reducing the number of available safe landing sites. Furthermore, when dealing with significant noise levels, there may be no safe sites identified because these methods lack a formal interpretation and quantification of sensor noise. Accordingly, a novel approach that incorporates sensor noise modeling to more accurately identify safe landing sites may be beneficial.

SUMMARY

Certain embodiments of the present invention may provide solutions to the problems and needs in the art that have not yet been fully identified, appreciated, or solved by current HDA technologies. For example, some embodiments of the present invention employ a probabilistic approach to detect hazards and identify safe landing sites in a given area.

In one embodiment, an apparatus is configured to implement probabilistic hazard detection and avoidance. The apparatus includes a processor and memory storing computer program instructions. The computer program instructions cause the processor to compute safety probabilities for a plurality of pixels in a digital elevation map and combine the safety probabilities for pixels associated with one or more aim points and orientations. The computer program instructions also cause the processor to assign a worst case probability value to each of the one or more aim points and orientations.

In another embodiment, a computer-implemented method is performed by a physical computing device. The computer-implemented method includes measuring roughness for each pixel under a landing craft and converting the measured roughness for each pixel into a probability of safety given a sensor noise model (e.g., a Gaussian model). The computer-implemented method also includes combining individual hazard probabilities of all pixels under the landing craft into a probability of safe touchdown at an aim point. The computer-implemented method may include incorporation of the probabilities of safety of nearby aim points, according to the navigation uncertainty, into a probability of safety at a landing site. These probabilities, in the form of a map with graphical markers denoting safest locations, may be transmitted to a visual display for an operator to select a landing location. In some embodiments, one or more safety-ranked sites may be transmitted to an automated flight manager (AFM) system.

In yet another embodiment, a computer program is embodied on a non-transitory computer-readable medium. The computer program causes a processor to analyze topography data during descent of a landing vehicle and probabilistically factor noise in the topography data to determine the probability of hazardous surface roughness and slopes. The computer program may also cause the processor to probabilistically factor in navigation uncertainty. The computer program then causes the processor to transmit the safety probabilities and locations of one or more landing sites that are deemed to be safe to a visual display device or a flight control system of the landing vehicle.

BRIEF DESCRIPTION OF THE DRAWINGS

For a proper understanding of the invention, reference should be made to the accompanying figures. These figures depict only some embodiments of the invention and are not limiting of the scope of the invention. Regarding the figures:

FIG. 2A illustrates a side view of a planetary lander, according to an embodiment of the present invention.

FIG. 2C illustrates a rasterized circle through the centers of the circular pads of the planetary lander, according to an embodiment of the present invention.

FIG. 5 illustrates a method for performing probabilistic hazard detection and avoidance, according to an embodiment of the present invention.

FIG. 6 illustrates a general method for performing probabilistic surface characterization, according to an embodiment of the present invention.

FIG. 8C illustrates the probability of hazard in the noisy DEM shown in FIG. 8B, according to an embodiment of the present invention.

DETAILED DESCRIPTION OF THE EMBODIMENTS

Figure 1:
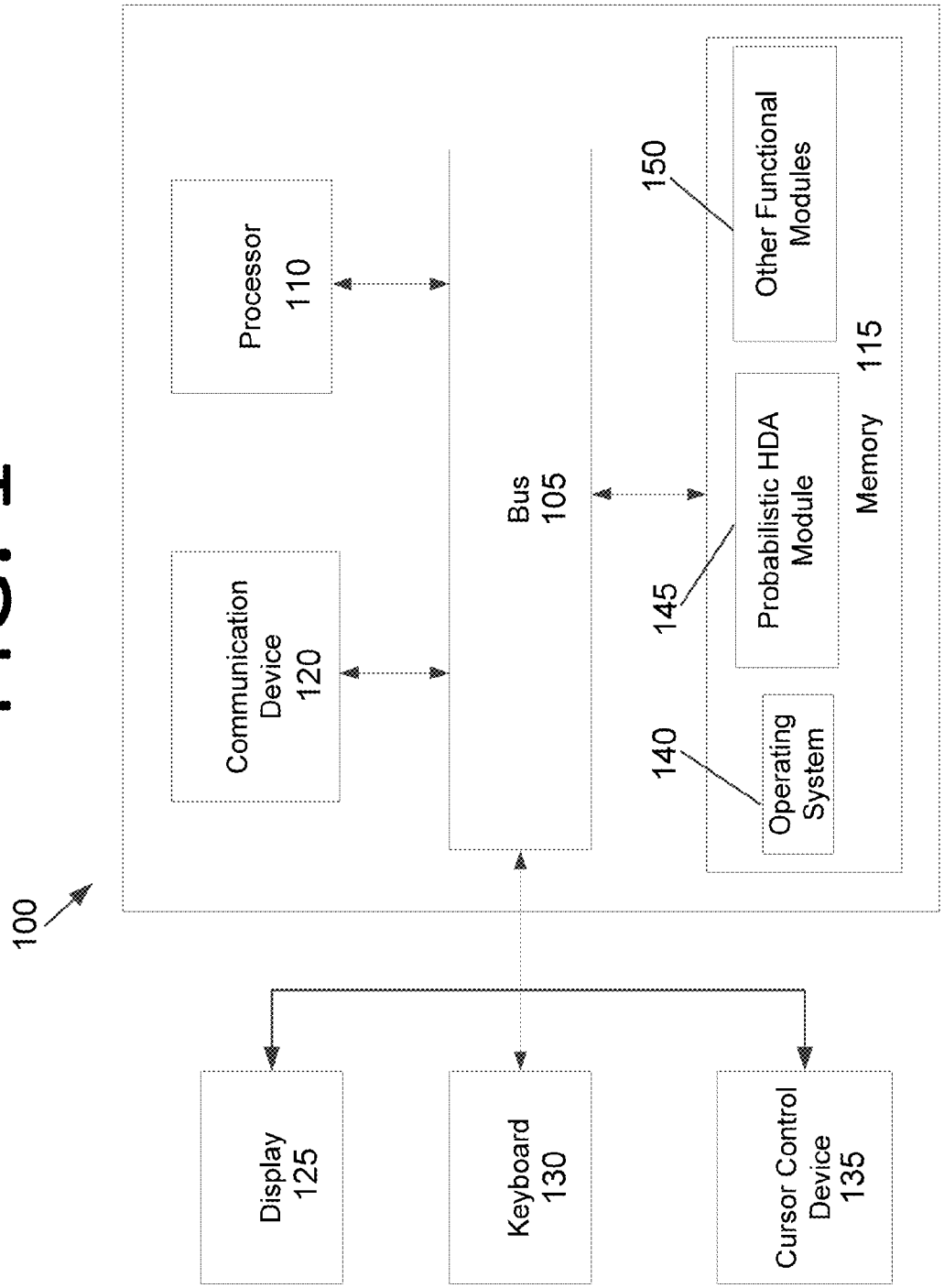
FIG. 1 illustrates a system for implementing a probabilistic approach to hazard detection and avoidance, according to an embodiment of the present invention.

It will be readily understood that the components of the present invention, as generally described and illustrated in the figures herein, may be arranged and designed in a wide variety of different configurations. Thus, the following detailed description of the embodiments of apparatuses, systems, methods, and computer readable media, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Some embodiments of the present invention pertain to an algorithm that probabilistically finds the safest location for landing during the descent of aircraft or spacecraft, such as by a planetary lander, a helicopter or Osprey®, Vertical Take-Off and Landing (VTOL) jet aircraft, or any other vehicle that may touch down on land or water. Some embodiments of the system look at the real-time topography during descent, identify safe landing locations, and either provide the safe landing locations to a pilot within the craft, a human controller external to the craft, or in some embodiments, to a control system to automatically divert the craft to an identified safe location. In some embodiments, the safest landing location in a given area may be selected, even where the location may not be perfectly safe for the vehicle due to generally bad terrain in the area. In such a case, the risk of the best location can be assessed and the pilot, human controller, or flight control system can make a determination of whether to land.

Automatic embodiments may be especially beneficial in the context of unmanned spacecraft that are at least partially autonomous due to the significant time it takes for control signals to reach the craft when far from Earth. For instance, take the example where a spacecraft is on or near Mars. Since light travels 186,000 miles per second, it will generally take a control signal at least 13 minutes to reach the spacecraft, and at least the same amount of time again before any responsive signals from the spacecraft can be received by a human controller on Earth. Clearly, Earth-based manual control during descent would typically be unfeasible.

In the context of spacecraft, unmanned planetary landers to date have landed "blind" without the benefit of onboard landing hazard detection and avoidance systems, using only pre-mission DEMs with insufficient resolution to detect all hazards. This constrains landing sites to very benign terrain and limits the scientific goals of missions. The use of high-resolution onboard DEMs allows for accurate hazard modeling and enables reaching more rough, and potentially more interesting, terrain. For instance, such locations may be more likely to contain minerals and/or geological formations of interest. Recent advances in high-resolution terrain sensing from onboard a craft and from orbit enable a more precise hazard detection model that incorporates the geometry of a landing vehicle. Because the technology is applicable to both terrestrial aircraft and spacecraft of any size, embodiments may be used in any landing environment, from the mountains of Afghanistan to Mars and beyond.

Some embodiments of the present invention use an input Digital Elevation Model (DEM) obtained via lidar-based sensing, but the algorithm can use a DEM generated by a stereo or multi-camera system, or by any other 3D sensing apparatus. In one embodiment, the DEM generated by the laser-based sensor has a resolution of 0.1 m and an associated Gaussian noise model is used to represent error in the resulting measured elevation. Embodiments of the present invention may robustly handle noise in lidar input data, or any other sensed input data, at any resolution, and may use a geometry-based algorithm to account for the size and shape of the landing craft. In operation, some embodiments of the algorithm (1) compute surface roughness and slopes; (2) use dimensions of the landing craft; and (3) determine hazardous surface roughness and terrain slopes using knowledge of the craft mechanical characteristics (hazard tolerances) and probability distribution models of noise. The size and dimensions of the terrain to be analyzed and the craft are a matter of design choice. Some embodiments incorporate rotational and navigational uncertainty at landing.

Some embodiments of the present invention enable a real-time lidar-based HDA capability for landed missions. In an embodiment exemplified by the TSAR software package developed for the ALHAT project, the HDA phase follows a Terrain Relative Navigation (TRN) phase that localizes the spacecraft with high precision. For a given trajectory, approach angle and slant range to the landing aim point, the HDA phase builds a 3-D surface model or DEM by projecting and mosaicking lidar images. The hazard detection algorithms characterize the safety of the surface and determine potential landing sites to divert to. Hazard detection is followed by Hazard Relative Navigation (HRN) for final touchdown. TSAR provides safe landing site information to the Automatic Flight Manager (AFM) for touchdown divert maneuvers. The integrated real-time TSAR package is used for bench testing, end-to-end simulated flight tests, and Monte Carlo simulations for performance evaluation.

Some embodiments of the present invention use lidar-based sensing that provides 3-D information day or night, but the algorithm can run using a single camera to compute terrain structure from the motion of the craft, or ort data from any other sensing apparatus that uses more than one camera. Embodiments of the present invention may robustly handle noise in lidar input data, or any other sensed input data, and can use a geometry-based algorithm to account for the size and shape of the landing craft. In general terms, a surface feature becomes a landing hazard as a function of the lander geometry. In operation, some embodiments of the algorithm (1) compute surface roughness and slopes; and (2) use mechanical characteristics (hazard tolerances) and dimensions of the landing craft to determine hazardous roughness and terrain slopes. The input Digital Elevation Model (DEM), a laser-based terrain model generated by the sensor, has a resolution of 0.1 m in some embodiments and uses an associated Gaussian noise model to represent error in the resulting measured elevation. In other embodiments, the sensor resolution is different with the effect that the different hazards may or not be resolvable. A resolution of 0.1 m, for example, allows reliable resolution of rocks that are 0.3 m tall or 0.6 m wide. Also, the noise model does not necessarily have to follow a Gaussian distribution. In some embodiments, the terrain under the landing craft's footprint is analyzed automatically, or the terrain to be analyzed may be selected manually by a pilot or controller. The size and dimensions of the terrain to be analyzed are a matter of design choice. Noise is handled probabilistically, so no thresholds are involved in the safety assessment process. In this process, the distance to the nearest hazard and the local roughness are taken into account together for landing site safety assessment and selection.

FIG. 1 illustrates a system 100 for implementing a probabilistic approach to hazard detection and avoidance, according to an embodiment of the present invention. System 100 includes a bus 105 or other communication mechanism for communicating information, and a processor 110 coupled to bus 105 for processing information. Processor 110 may be any type of general or specific purpose processor, including a central processing unit (CPU) or application specific integrated circuit (ASIC). System 100 further includes a memory 115 for storing information and instructions to be executed by processor 110. Memory 115 can be comprised of any combination of random access memory (RAM), read only memory (ROM), flash memory, cache, static storage such as a magnetic, optical disk, or solid state memory devices, or any other types of non-transitory computer-readable media or combinations thereof. Additionally, system 100 includes a communication device 120, such as a wireless network interface card, to provide access to a network.

Non-transitory computer-readable media may be any available media that can be accessed by processor 110 and may include both volatile and non-volatile media, removable and non-removable media, and communication media. Communication media may include computer-readable instructions, data structures, program modules, lookup tables, or other data in a modulated data signal such as a carrier wave or other transport mechanism and includes any information delivery media.

Processor 110 is further coupled via bus 105 to a display 125, such as a Liquid Crystal Display ("LCD"), for displaying information to a user. A keyboard 130 and a cursor control device 135, such as a computer mouse, are further coupled to bus 105 to enable a user to interface with system 100.

In one embodiment, memory 115 stores software modules that provide functionality when executed by processor 110. The modules include an operating system 140 for system 100. The modules further include a probabilistic HDA module 145 that is configured to provide a probabilistic approach to hazard detection and avoidance. System 100 may include one or more additional functional modules 150 that include additional functionality.

One skilled in the art will appreciate that a "system" could be embodied as a personal computer, a server, a console, a personal digital assistant (PDA), a cell phone, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Accounting for Landing Aircraft or Spacecraft Geometry

When determining safe landing sites for a craft, it is beneficial to know the specific geometry of the craft because some landers can safely land on sites that others cannot. The high resolution of the on-board generated DEM enables the geometry of the landing craft to be taken into account and contact of the craft with the surface at touchdown to be modeled in order to calculate craft-specific slope and roughness. Surface features may become hazards as a result of the landing craft's geometry and mechanical slope and roughness tolerances. In general, the principles of the HDA algorithm can be used for any landing vehicle geometry. The algorithm may be adapted for a legged landing vehicle of any size with any number of legs, wheels, skis, or any other support mechanism, as long as the fidelity of the DEM allows for the modeling of surface contact. The algorithm can be also used for a flat-bottom lander. Many embodiments of the present invention are able to use a geometric model to a higher level of fidelity than is possible with conventional systems.

FIG. 2A illustrates a side view of a planetary lander 200, according to an embodiment of the present invention. The lander may be, for example, an Altair class lander. Planetary lander 200 has a circular footprint of approximately 15 m in diameter (more specifically, 13.2 m in the illustrated design) and is supported on four symmetrically placed legs 210 with circular pads 220 (only three of which are visible in this view). While the pads are circular in this embodiment, the shape of the pads is a matter of design choice. Whether the legs are rigid or flexible is also a matter of design choice. Each of legs 210 extends from, and is attached to, body 230 of planetary lander 200. Each of circular pads 220 has a diameter of 1.6 m. In this embodiment, the roughness tolerance is 0.3 m, the slope tolerance is 10 degrees, each of legs 210 and circular pads 220 are assumed to be rigid, and the center of the lander is at the current pixel in the surface analysis and characterization process.

The contact of circular pads 220 of planetary lander 200 with the surface may be modeled by fitting a robust plane to the area under each of circular pads 220 in order to average out the DEM noise. The center of a fitted plain may be taken as the touchdown position for each of circular pads 220. A high fidelity model of the pad-terrain contact can be incorporated, provided there is enough onboard processing time and sufficient DEM resolution.

Figure 2B:
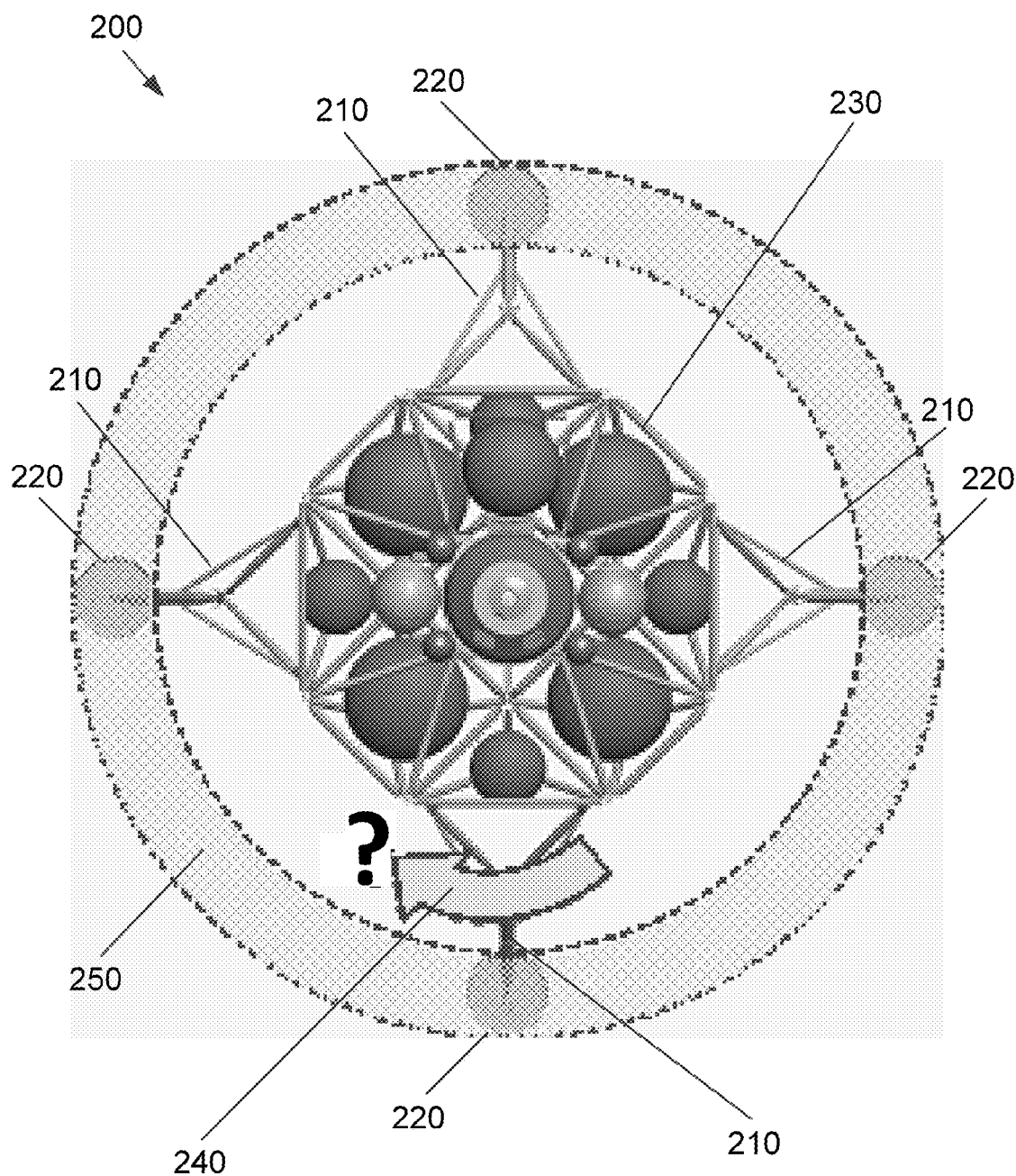
FIG. 2B illustrates a top view of the planetary lander with an unknown rotational orientation, according to an embodiment of the present invention.

FIG. 2B illustrates a top view of planetary lander 200 with an unknown rotational pose 240, according to an embodiment of the present invention. Since the exact orientation of planetary lander 200 at touchdown is unknown and may fall anywhere within ring 250, the algorithm may consider all possible rotational configurations (orientations) of planetary lander 200 around the landing aim point, which is under the center of planetary lander 200. For a particular orientation of planetary lander 200 at touchdown, at least three of the four circular pads 220 will contact the surface and the remaining pad may be above, or also on, the surface. In some embodiments, it may be assumed that each of circular pads 220 is rigid and does not dig deep into the surface.

FIG. 2C illustrates a rasterized circle 260 through circular pads 220 of planetary lander 200, according to an embodiment of the present invention. Circle 260 is rasterized using Bresenham's circle algorithm in some embodiments. First, all unique quadruples of four pad placements are determined. For each placement, there are four combinations of three contact pads, which form a plane. Some placements are not feasible (e.g., 4th pad under surface). Slope and roughness are measured for each placement. In some embodiments, the number of placements that are analyzed may be reduced to save processing time if, for example, the expected variation in craft pose has small deviations from the craft's predetermined trajectory.

Figure 2D:
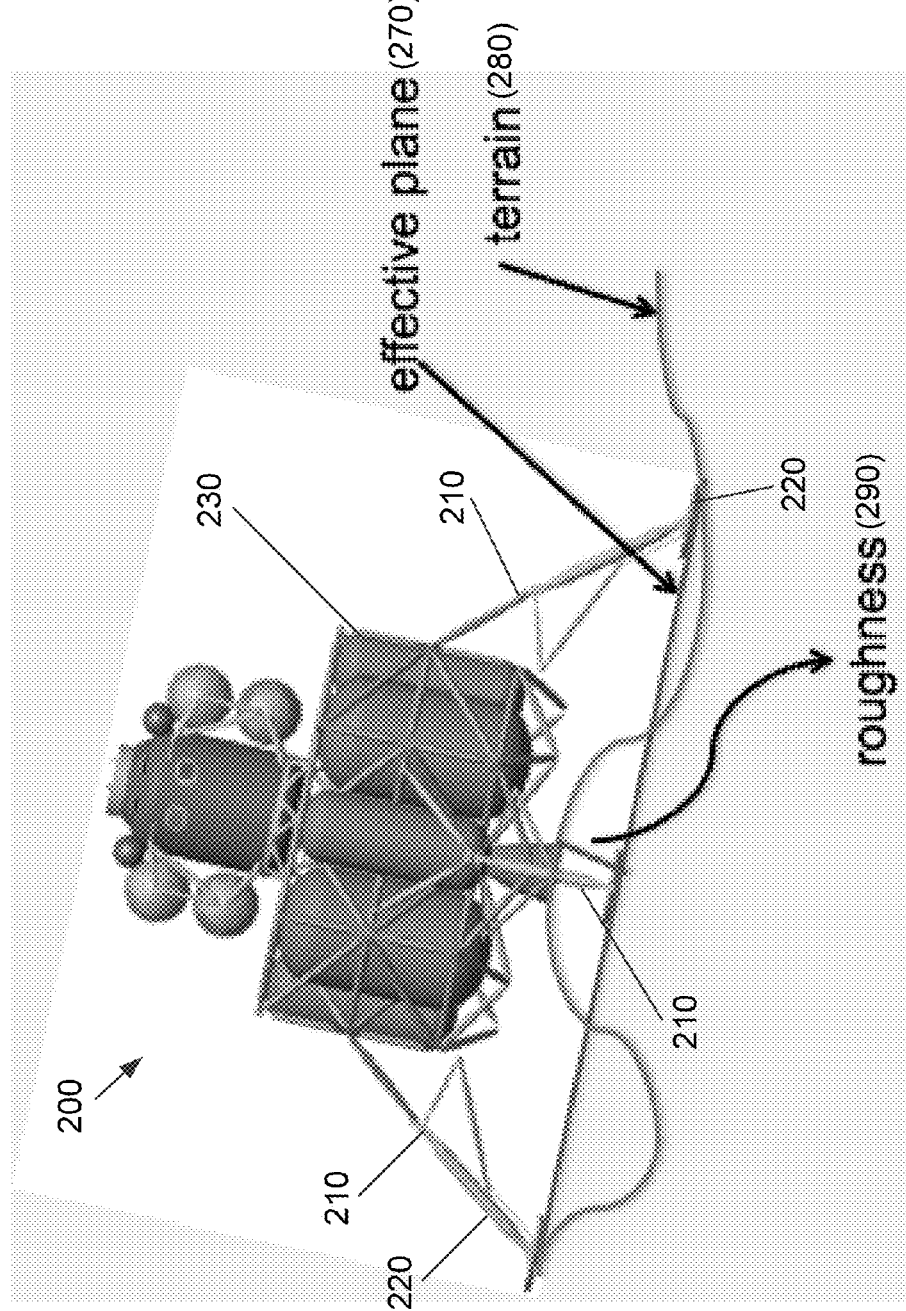
FIG. 2D illustrates a side view of the planetary lander when landing on a surface, according to an embodiment of the present invention.

FIG. 2D illustrates a side view of the planetary lander 200 when landing on a surface, according to an embodiment of the present invention. Three of the four support legs 210, each having a respective circular pad 220, are visible in this view and extend from body 230. The effective plane 270 is formed by at least three of circular pads 220 contacting the terrain (or surface) 280 and the roughness 290 above the plane when planetary lander 200 contacts the terrain can be seen in this figure, causing planetary lander 200 to tilt upon landing and encounter a roughness hazard under the craft body. The slope is the largest inclination of the effective plane of planetary lander 200, as determined by the elevation of three of circular pads 220, for all possible orientations of planetary lander 200 at each terrain map pixel, or aim point.

The algorithm also determines the presence of roughness under planetary lander 200 by examining the terrain under planetary lander 200. The roughness is the largest perpendicular distance across all possible local effective slope planes. There is one such plane for each possible leg placement. For a particular plane, i.e. orientation, distances are measured to the plane from the surface elevations (pixels) below the lander and only distances above the plane are considered. Roughness may be measured at all pixels, or a subset of pixels, under planetary lander 200 at each aim point. The largest slope and roughness may be assessed independently of each other (i.e., the largest slope and roughness do not need to come from the same lander plane). Aim points at which either the slope or roughness are greater than the tolerances of lander 200 are labeled as hazardous. However, in the presence of noise, a probability of safety value can be assigned that assesses the chance that the aforementioned event occurs.

A plane may be used to fit the size of the landing vehicle to determine slope and roughness. However, plane fitting smoothens out and underestimates the effective slope. Accordingly, some embodiments of the present invention are able to achieve superior performance by modeling the scenario where a vehicle's pad steps inside a crater or on top of a rock, causing a large tilt. Also, fitting planes have the inherent problem with detecting roughness of the crater rim or rocks present on the crater rim. The algorithms used in some embodiments of the present invention are able to detect such roughness.

Figure 3A:
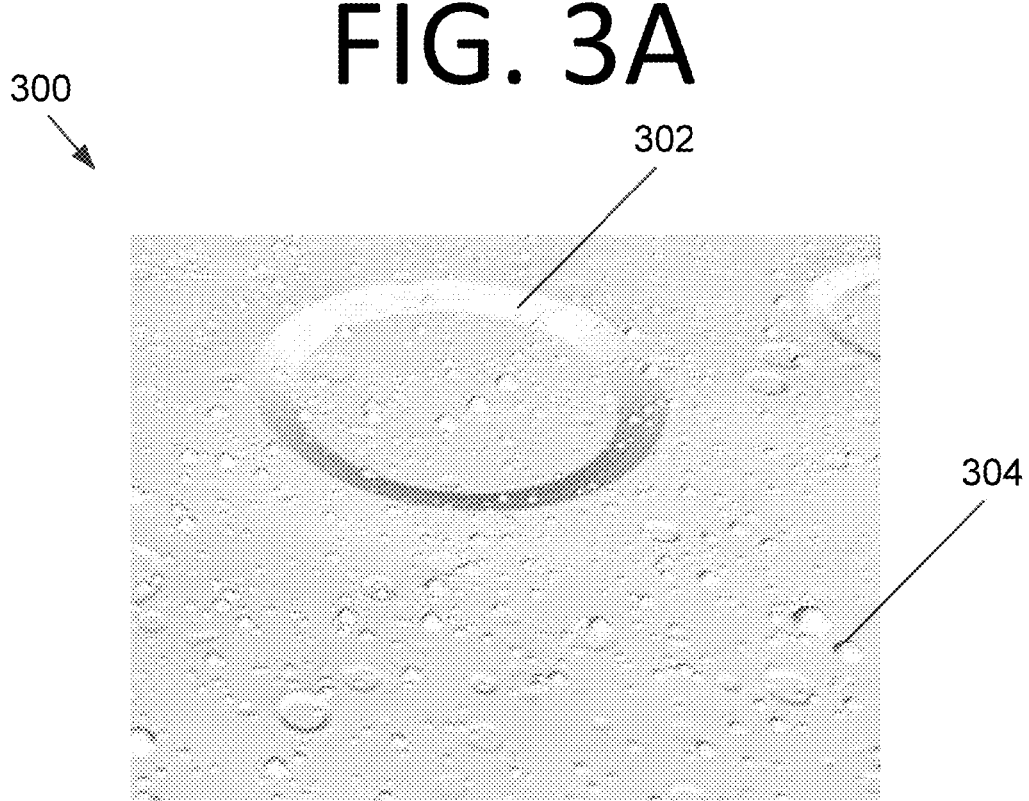
FIG. 3A illustrates a shaded elevation map, according to an embodiment of the present invention.
Figure 3B:
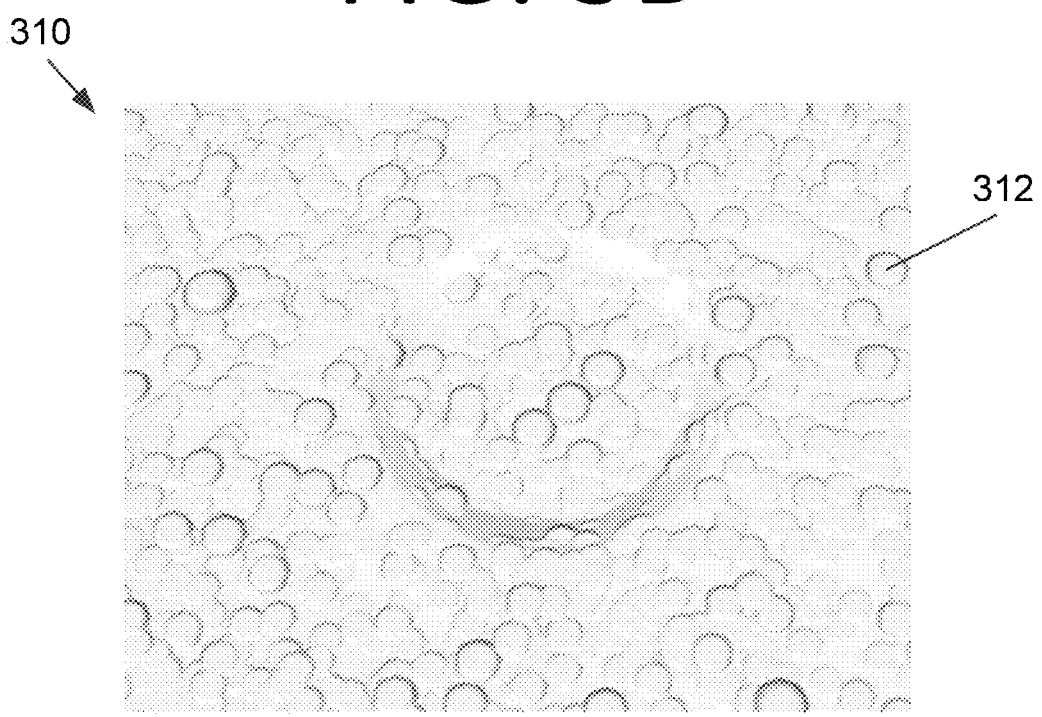
FIG. 3B illustrates a pad footprint map, according to an embodiment of the present invention.

FIG. 3A illustrates a small patch of an elevation map (DEM) 300, according to an embodiment of the present invention. Elevation map 300 models terrain with various geological features, such as crater 302 or rock 304. This map may be obtained by a scanning or flash lidar sensor and typically contains noise as illustrated in the ensuing figures and discussed below. FIG. 3B illustrates a pad footprint map 310, according to an embodiment of the present invention. Individual pad footprints, such as pad footprint 312, are present in pad footprint map 310, which models contact of an individual pad with the local terrain. Since all pads are the same size and shape, a combination of these pre-computed footprints is used at each particular aim point.

Figure 3C:
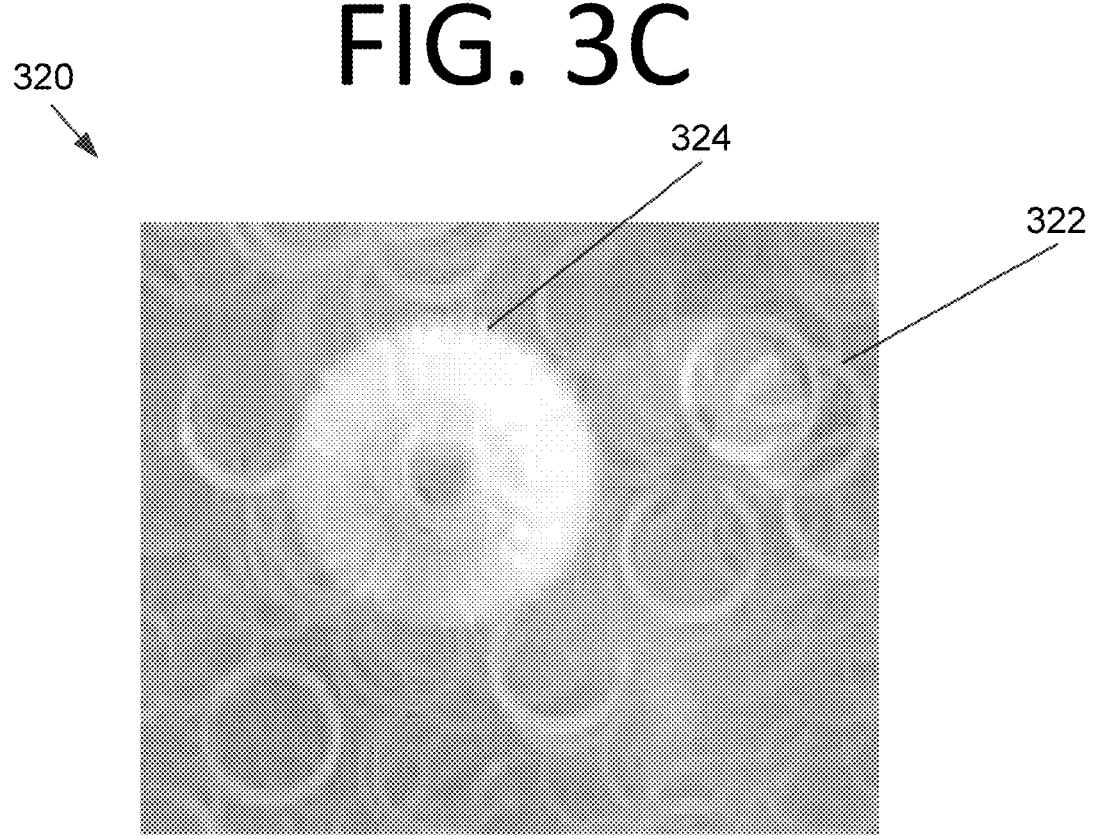
FIG. 3C illustrates a novel effective slope map generated from the elevation map shown in FIG. 3A, according to an embodiment of the present invention.
Figure 3D:
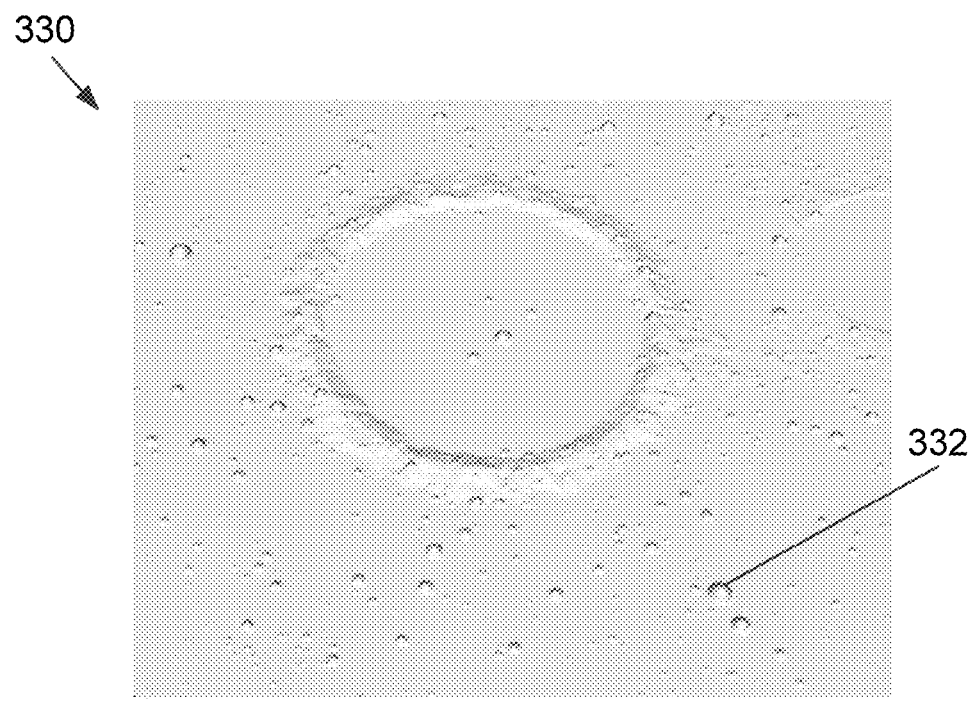
FIG. 3D illustrates a novel roughness map generated from the elevation map shown in FIG. 3A, according to an embodiment of the present invention.

FIG. 3C illustrates an effective slope map 320 generated from elevation map 300, according to an embodiment of the present invention. Rings, such as ring 322 and rosette 324, have a radius equal to that of the lander, and are the result of the presence of hazardous roughness (e.g., rocks and fresh crater rims). A lander with its center (aim point) inside ring 322 may have one of its pads on the hazard. The ring structure manifests itself for all locations around the hazard (e.g., a ring). In some embodiments, the presence of sensor noise may not have a significant impact on the estimated effective slope when the pads, and the craft itself, are much larger than the underlying DEM resolution, for example. FIG. 3D illustrates a roughness map 330 generated from elevation map 300, according to an embodiment of the present invention. Rough areas, due to rocks and crater rims, exceeding a certain roughness tolerance (such as area 332) are shown. In the presence of noise, the probability of roughness and the probability of safety must be determined instead, and in particular for sensitive craft that have small roughness tolerances (e.g., 0.3 m).

Handling Sensor Noise

The procedure described above with reference to FIGS. 2A-D is optimal for terrain surfaces reconstructed with high precision. Surfaces reconstructed from lidar sensing have inherent sensor noise that makes it difficult to effectively employ purely deterministic approaches. The position and slope of the effective lander planes are not affected significantly by noise in this embodiment because the lander pads cover a considerable number of pixels and the random elevation noise gets averaged out. However, this is not the case for the roughness measurements made at individual pixels under the landing vehicle. These measurements, being distances measured to a single noisy pixel, inherit the elevation noise introduced by the sensor system. In other embodiments involving small landers, coarser DEM resolution, or increased noise levels, the model of the effective slope plane should also be handled probabilistically.

Deterministic approaches use thresholds on noisy roughness measurements. Due to the elevation errors, detection thresholds are set lower than the hazard tolerance to ensure safety, e.g. that legitimate hazards are not missed (false negatives). These approaches introduce false alarms and artificially reduce the available safe landing areas.

To better characterize the hazards on a noisy surface, some embodiments of the present invention use a probabilistic model of roughness. Such embodiments compute the probability of safety for each pixel under the landing vehicle. This probability of safety is the probability that the noisy roughness measurement is above the roughness tolerance given the noise model of the sensor system. All output probabilities of safety under the lander may be combined together to derive the final probability of safety for each specific landing aim point and orientation. The worst-case probability value may be taken across all orientations and assigned to the aim point. This is a conservative measure that can be refined with knowledge of the landing vehicle's attitude at touchdown.

Figure 4:
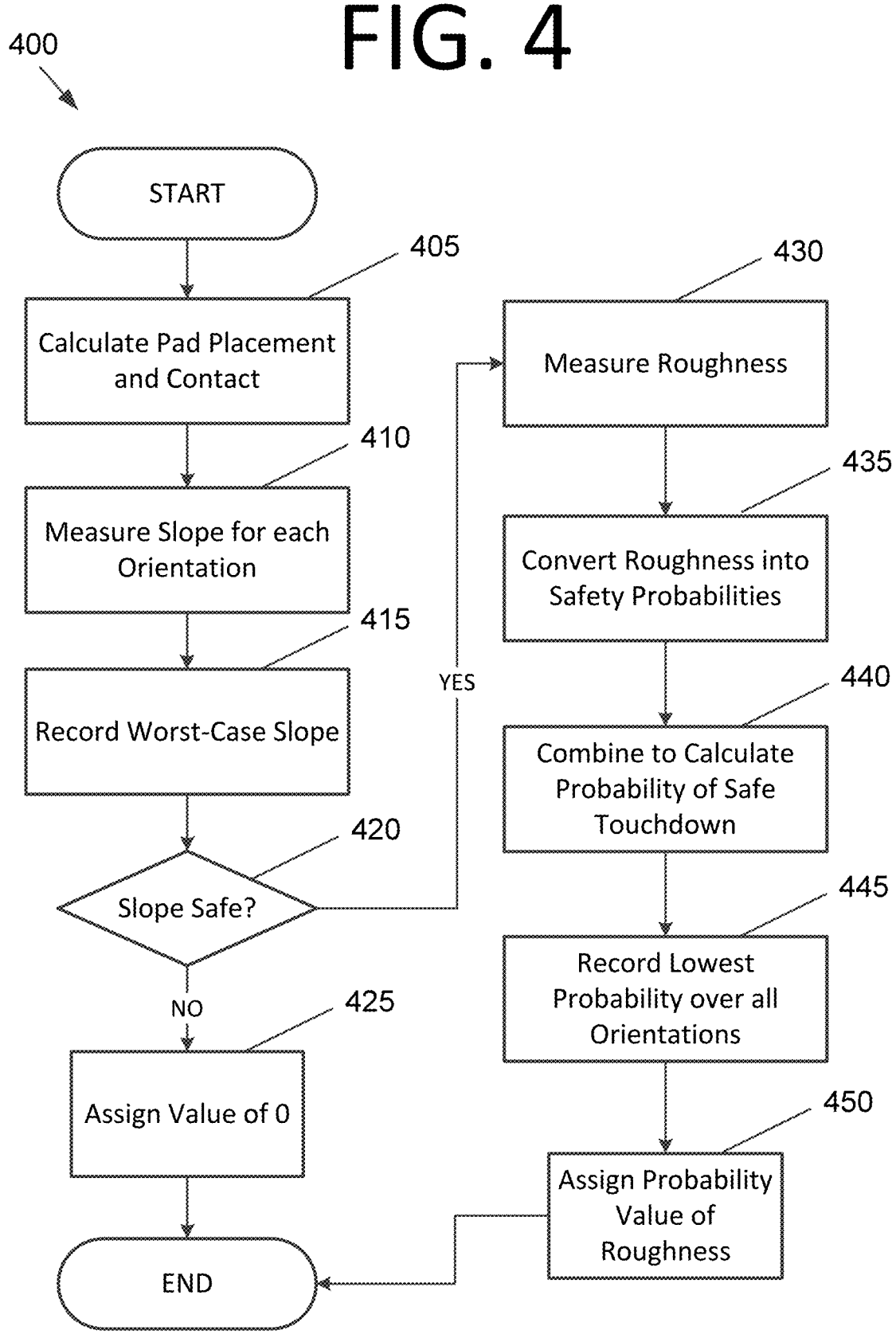
FIG. 4 illustrates a method for determining the probability of safe landing at individual aim points and orientations while accounting for sensor noise, according to an embodiment of the present invention.

In view of the foregoing, FIG. 4 illustrates a method 400 for determining the probability of safe landing at individual aim points and orientations while accounting for sensor noise, according to an embodiment of the present invention. The method may be performed, for example, by planetary lander 200 of FIGS. 2A-D, or by any terrestrial craft or spacecraft. The lander geometry and DEM are taken into account. The method begins with calculating a pad placement map at 405 by computing contact of a lander pad with the surface at every pixel. For a specific aim point, slope is measured at 410 by combining pad placements for each pertinent lander orientation. The worst-case slope under all orientations is then recorded at 415. If the worst-case slope over all orientations is deemed unsafe at 420 because it exceeds a predetermined slope tolerance, a probability value of 0 is assigned at 425, and the method then ends.

However, if the worst-case slope does not exceed the slope tolerance at 420, roughness is taken into account, and roughness is measured for each pixel under the landing craft at 430. The sensor noise model and roughness tolerance are taken into account for this process. The roughness is then converted into probabilities of safety given a sensor noise model (such as a Gaussian model) at 435. In some embodiments, this probability estimation process may be accomplished by applying the Naïve Bayes Rule to compute the probability of hazard independently at every pixel. Individual hazard probabilities of all pixels under the landing craft are combined into a probability of safe touchdown at a particular aim point and for a particular orientation at 440 using the sensor's noise model and the lander's roughness tolerance. The probability of safe touchdown may be computed for all pertinent orientations, and the smallest probability may be taken and used as the worst-case probability value for safe touchdown at an aim point at 445.

The lowest probability value of roughness is then assigned at 450. While values between "1" and "0" are used here, any suitable value, score, or rating system may be used in other embodiments. In some embodiments, the lowest probability of safe touchdown over all orientations may be recorded. The pixels under the landing craft may be from a digital elevation map produced by a lidar system.

FIG. 5 illustrates a method 500 for performing probabilistic hazard detection and avoidance, according to an embodiment of the present invention. Safety probabilities are computed for a plurality of aim points in a digital elevation map at 510, and in some embodiments, may be performed by the method of FIG. 4. To incorporate navigational uncertainty, the algorithm combines probabilities of safe touchdown at aim points inside each landing site to produce the final success of landing estimate, or safety score, for the current trajectory at 520. The probability of landing at a site is the sum of the probability of landing at specific aim points inside the site weighted by the chance of going to those points due to navigation errors using a navigation error model. This step may be done by convolving a probability of safety map with a two-dimensional (2D) Gaussian kernel with zero mean and standard deviations equal to the expected navigational uncertainty. The current navigation sigma is 1 m in both x and y directions in some embodiments, bot may be any suitable distance depending on navigation accuracy. The result of the convolution is the final safety map, which is used for selecting a landing site. This safety map correctly captures the distance to surrounding hazards as well as the chance of landing away from the aim point.

FIG. 6 illustrates a general method 600 for performing probabilistic surface characterization, according to an embodiment of the present invention. Topography data is analyzed during descent of a landing vehicle at 610. In some embodiments, the topography data includes real-time topography data from a lidar system. Noise in the topography data is probabilistically factored to determine safety probabilities based on surface roughness and slopes at 620, which may be performed by applying Bayesian statistics similar to FIG. 4. The error (i.e., uncertainty) in navigation is probabilistically incorporated by applying convolution similar to FIG. 5 at 630.

One or more safe landing sites are output based on the probability values assigned to the sites in the safety map to a visual display device for review by a pilot or controller at 640. The safe landing sites may be displayed in ascending or descending order based on relative safety. In the alternative, flight control systems may be engaged to direct the lander to one of the safe landing sites based on the probability values assigned to the lander and other constraints in some embodiments. The flight control systems may be engaged to direct the landing craft directly to the safest landing site.

Safe Site Selection

The final safety probability map from the previous step incorporates knowledge of sensor noise and navigation uncertainty. Regional maxima in the final probability map may be determined by applying a morphological domes method. These maxima are the landing sites reported by the algorithm ranked in order of decreasing safety in this embodiment, but any ordering or subset of landing sites is possible in other embodiments. In still other embodiments, only the safest landing site is presented. The coordinates of the best sites are reported as candidates for landing, along with their safety index (probability), to the AFM, which in turn selects the final landing site. Given that fuel and other constrains are met, the final site may be the least hazardous site on the surface.

Probabilistic HDA Model

Some embodiments of the present invention employ a probabilistic approach to handle uncertainties in the terrain map elevations and in the navigation system position estimates. Such an approach may achieve a more accurate representation of the safety of the landing site that is not overly conservative like thresholding can be. This allows distinguishing of safer sites when the noise level is close to the tolerance.

For example, suppose a landing vehicle lands at a particular surface location in a particular orientation. It may be desirable to calculate the probability of safe landing given a noisy DEM, which may be obtained by lidar. Consider a lander with two mechanical tolerances of slope and roughness. Assume the slope of the landing vehicle has already been checked and is largely unaffected by the noise. It follows that the hypothesis for safe landing is that, in the true surface, no roughness under the lander exceeds its mechanical tolerance. Let H be the set of all possible surfaces satisfying this hypothesis, i.e. all safe surfaces. Then, the probability of safe landing is the probability that the true surface is actually one of the safe surfaces in H. For a given possible true surface S in H, the probability that S could actually be the true surface given the observed lidar DEM D is calculated using Bayes' theorem. Then, the resulting probabilities are summed up over the mutually exclusive surfaces of H.

$$P(\text{safe} \mid D) = \sum_{S \in H} \frac{P(D \mid S) P(S)}{P(D)} = k \sum_{S \in H} P(D \mid S)$$

It is assumed that all surfaces in H are equally likely to be the true surface (i.e., to occur in the natural planetary terrain). Under this assumption, the term $P(S)$ is identical for any S. The term $P(D)$ is also constant. Let the quotient thereof equal k. In reality, however, surface pixels are correlated and some terrains with random jumps in elevation do not occur naturally.

Now consider the discrete pixels making up the true surface. It is assumed that the pixels have no correlation and thus independently contribute to safety. It is further assumed that the sensor noise is independent and identically distributed (IID) at each pixel. Accordingly, the pixels in the lidar DEM are also independent. These assumptions allow the application of the Naïve Bayes Rule and the probability of safety to be computed independently at every pixel. Let U be the set of all independent pixels (x,y) that are under the landing vehicle. Terrain is safe to land on if and only if all points (x,y) are safe. Thus, the probability of a safe landing is the product (logical AND) of the probabilities of the individual pixels being safe.

In turn, the probability of a given pixel (x,y) being safe is the sum (logical OR) of the probabilities of the pixel belonging to each one of the safe surfaces.

$$P(\text{safe}) = k \prod_{(x,y) \in U} \sum_{S(x,y) \in H} P(D(x, y) \mid S(x, y))$$

These assumptions are conservative and represent a worse scenario than in reality, but the assumptions make the math practical to implement. Instead of taking the product of the individual probabilities, in some embodiments, a more elaborate method could be employed with autocorrelation to determine the overall probability of safety.

For a pixel in U to be safe, the perpendicular distance from the landing vehicle's actual pad plane to that pixel in the true surface (true roughness) must not exceed the roughness tolerance. However, only the noisy lidar DEM is available to make this judgment. As discussed earlier, the calculation of the landing vehicle's plane using the lidar DEM is not sensitive to the lidar noise that is present and can be accepted as being the actual value. On the other hand, the distance computed using the lidar DEM (measured roughness) has error due to elevation noise. The error in the measured roughness at a given pixel is proportional to the error in the observed elevation at that pixel.

$$[D(x,y)-S(x,y)] \propto [RD(x,y)-RS(x,y)]$$

To prove that this is the case, suppose the plane (both true and measured) of the lander has equation:

$$ax+by+cz+d=0$$

The roughness r is computed by calculation of the distance to the plane from a point (x,y,z) on the three-dimensional surface as follows:

$$r = \frac{ax + by + cz + d}{\sqrt{a^2 + b^2 + c^2}}$$

The error in the measured roughness as compared to the true roughness is:

$$[RD(x, y) - RS(x, y)] = \frac{ax + by + cD(x, y) + d}{\sqrt{a^2 + b^2 + c^2}} - \frac{ax + by + cS(x, y) + d}{\sqrt{a^2 + b^2 + c^2}} = \frac{c}{\sqrt{a^2 + b^2 + c^2}} [D(x, y) - S(x, y)]$$

Furthermore, the probability that the observed elevation D(x,y) given a particular true elevation S(x,y) is equal to the probability of the measured roughness RD(x,y) given the corresponding true roughness RS(x,y). Thus, the probability of safety can be restated in terms of the roughness at each pixel. The safe roughness values corresponding to the safe elevations $S(x,y) \in H$ ranges from negative infinity up to the roughness tolerance Tol. Thus, at each pixel, we integrate over all safe roughness values the probability that, given a particular true roughness r, the measured roughness RD(x,y) occurred.

$$P(D(x, y) \mid S(x, y)) = P(RD(x, y) \mid RS(x, y))$$

$$P(\text{safe}) = k \prod_{(x,y) \in U} \int_{-\infty}^{Tol} P(RD(x, y) \mid r) \, dr$$

The elevation noise is modeled as a zero-mean Gaussian with standard deviation σ derived from the calibration of the lidar instrument. As mentioned above, the elevation noise is assumed to be the IID at each DEM pixel. Under this simple Gaussian model, the pixel-to-pixel noise variability of the lidar as well as the change in noise due to the varying incidence angle of the sensor's rays with the surface are ignored. Instead, the worst-case scenario of direct incidence and maximum pixel noise is taken. In practice, it would be hard to determine the exact noise model for each DEM pixel where the true terrain is not known a priori and the DEM is assembled from mosaicked images.

Given the elevation noise model, the error in the observed elevation at a given pixel is distributed as random Gaussian noise. Because of the proportionality, the roughness measured at every pixel is also distributed as a Gaussian, but centered about the true roughness r and with standard deviation equal to a constant times σ. Thus, the probability of the measured roughness rd given the true roughness r is computed by evaluating a Gaussian with mean r and sigma σ at s. By symmetry, we can switch the mean and evaluation point.

$$[D(x, y) - S(x, y)] \sim N(0, \sigma^2) \Rightarrow D(x, y) \sim N(S(x, y), \sigma^2)$$

$$[RD(x, y) - RS(x, y)] \sim N(0, c^2\sigma^2) \Rightarrow RD(x, y) \sim N(S(x, y), c^2\sigma^2)$$

$$P(rd \mid r) = N(r, \sigma^2)\mid_{rd} = N(rd, \sigma^2)\mid_r$$

Substituting the Gaussian expression into the safety equation yields:

$$P(\text{safe}) = k \prod_{(x,y) \in U} \int_{-\infty}^{Tol} N(RD(x, y), c^2\sigma^2)\bigg|_r dr$$

The constant c can be removed:

$$P(\text{safe}) = kc^{|U|} \prod_{(x,y) \in U} \int_{-\infty}^{Tol} N(RD(x, y), \sigma^2)\bigg|_r dr$$

The integral expression is simply a Gaussian CDF evaluated at the tolerance:

$$P(\text{safe}) = kc^{|U|} \prod_{(x,y) \in U} \Phi\left(\frac{Tol - RD(x, y)}{\sigma}\right)$$

Note that the proportionality constant c is different for each orientation, since the equation of the lander plane changes. The constant k is the same for all orientations and all landing locations.

The probability P(safe) can be computed for every possible orientation, and then the smallest probability can be taken as the final chance of landing safely at a particular location. This conservatively assumes that the landing vehicle will always land in the worst-case orientation. A weighted average of the probabilities can be taken instead if the chance of ending up in particular orientation is known.

So far, it has been assumed that any random surface is equally possible. That is, the priors in the Bayesian formulation all have a probability of 1. With knowledge of the statistical distributions of the surface features (rocks, craters, slopes, etc.), one can use prior probability weights for the possible true surfaces that are derived from such statistical distributions. Rock fields on Mars, for example, are known to have an exponential size frequency distribution model. The net effect is that it is not assumed that all possible surface configurations need to be considered equally, but rather, the probability estimates can be further refined by incorporating knowledge of the surfaces. A second approach to constrain the possible true surfaces would be to incorporate knowledge derived from analysis of high resolution (submeter) orbital images. Such knowledge is available from recent Mars missions, for example.

FIGS. 7A-D and 8A-D illustrate an example of the terrain, intermediate maps, and a final safety map for an embodiment that uses flash lidar to sense a 90 m×90 m area of lunar terrain at 0.1 m resolution, from a 1000 m altitude. The sensor noise model is a Gaussian with sigma 0.05 m, and the lander, illustrated in FIG. 2A, has a 10-degree tolerance to slope and a 0.3 m tolerance to roughness.

Figure 7A:
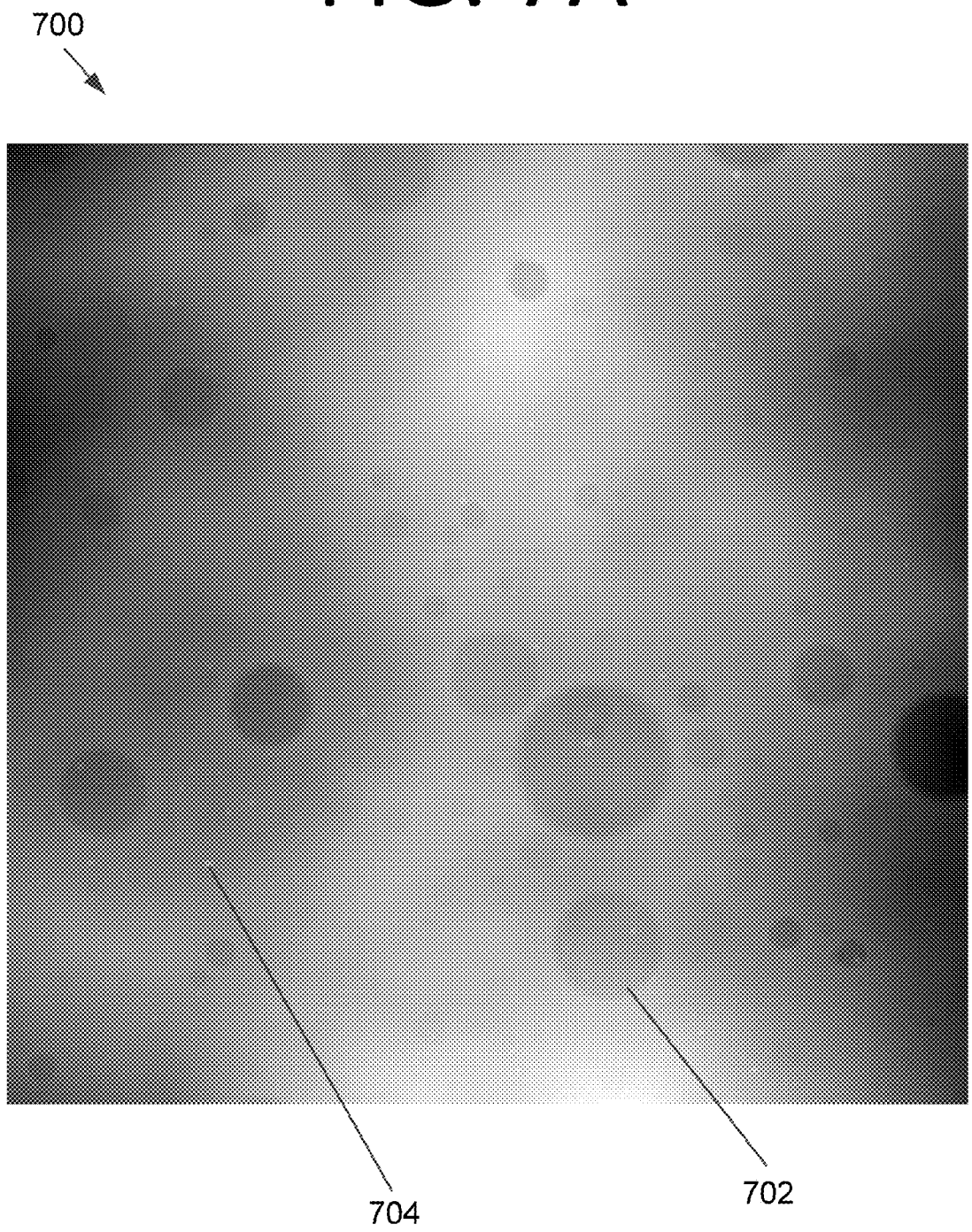
FIG. 7A illustrates a synthetic lunar DEM representing 90 m×90 m of terrain in the lunar smooth mare zones where the map pixels encode elevation, according to an embodiment of the present invention.
Figure 7B:
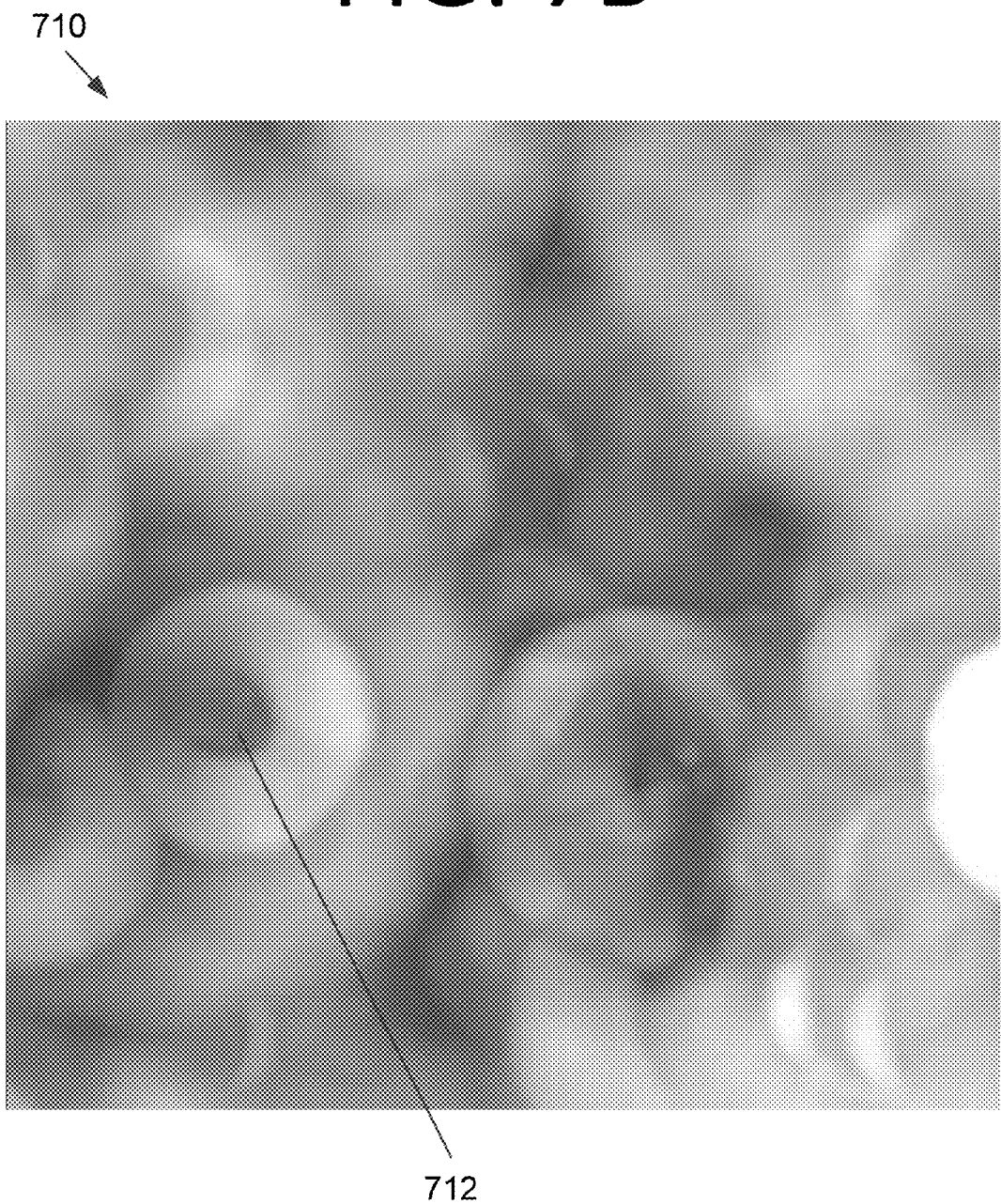
FIG. 7B illustrates a lander geometry-based slope map computed from the DEM shown in FIG. 7A, according to an embodiment of the present invention.

FIG. 7A illustrates the lunar smooth mare terrain by noiseless DEM 700, according to an embodiment of the present invention. The pixels (900×900) encode elevation in meters. Brighter pixels are closer to the sensor. Craters such as 702 are generally easily discerned, but rocks are small and appear as brighter-than-surround small patches such as 704. FIG. 7B illustrates lander geometry-based worst-case effective slope 710, according to an embodiment of the present invention. Pixels encode slope in degrees and brighter pixels denote higher slope values. Note that regions inside of craters that are larger than the lander have a low slope region 712 and would be safe to land in. If the lander is mobile, however, this would represent an inescapable trap.

Figure 7C:
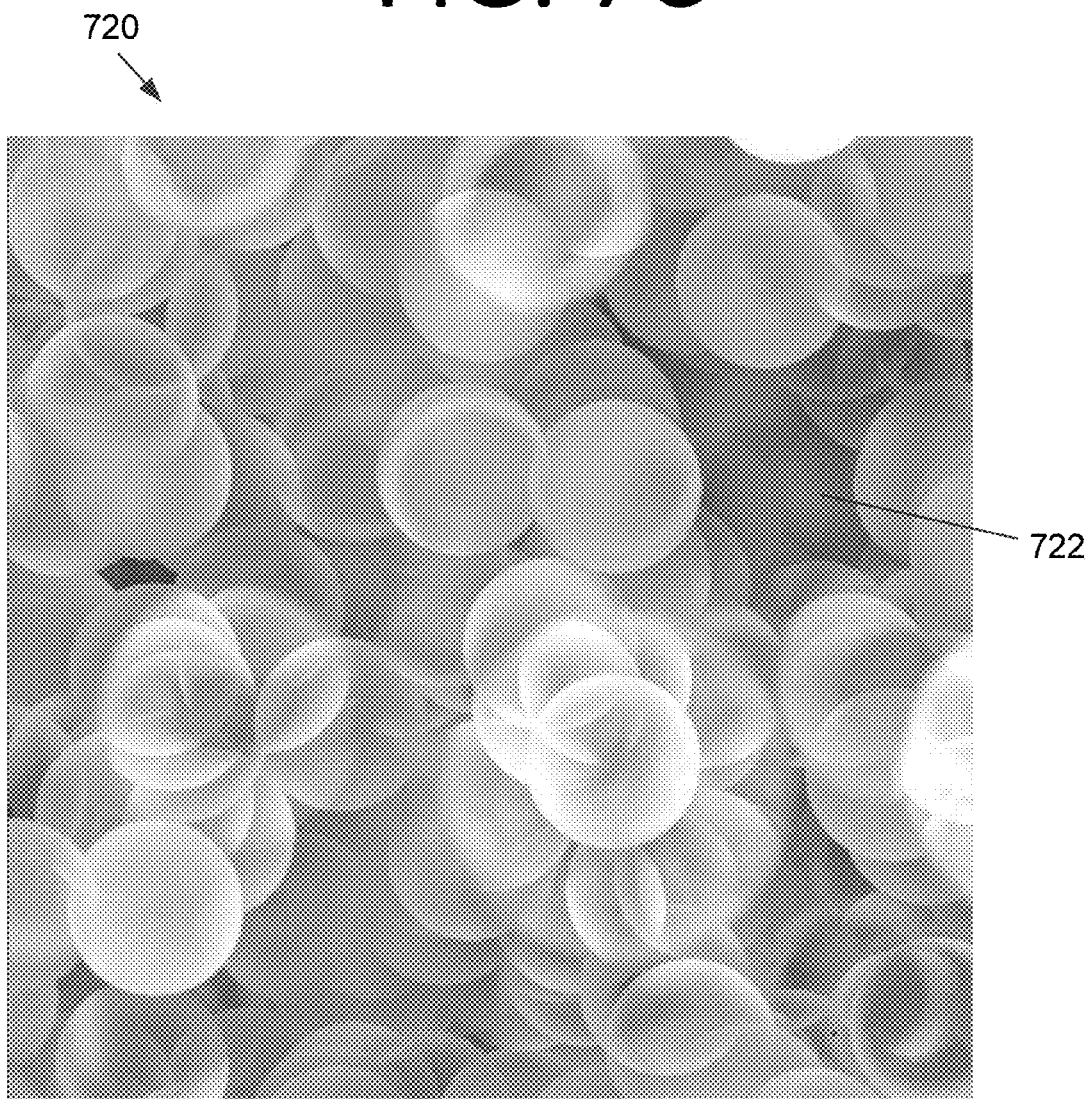
FIG. 7C illustrates a lander geometry-based surface roughness map from the DEM shown in FIG. 7A, according to an embodiment of the present invention.
Figure 7D:
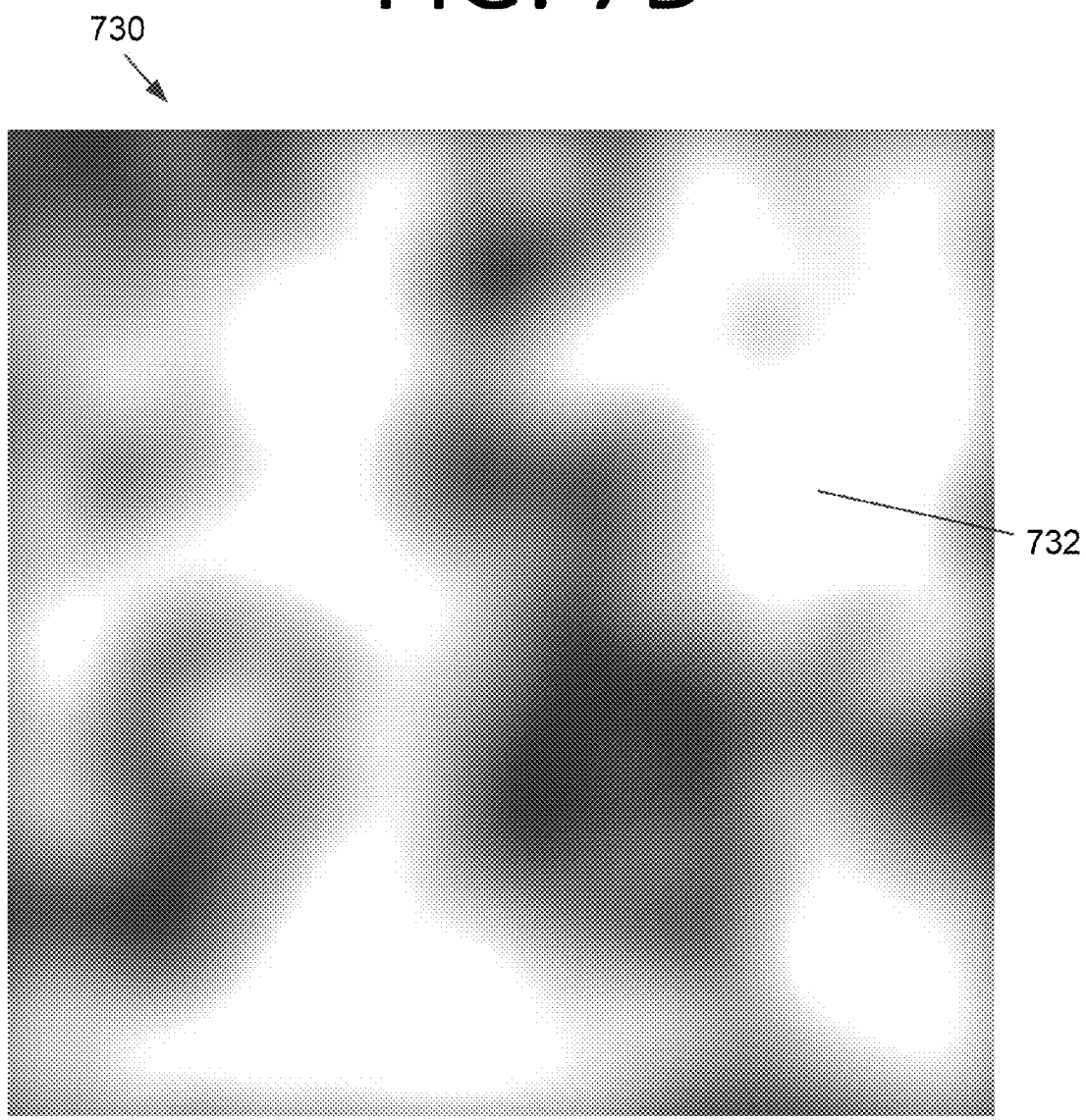
FIG. 7D illustrates a probability of safety map computed for the DEM shown in FIG. 7A, according to an embodiment of the present invention.

FIG. 7C illustrates lander geometry-based surface roughness 720, according to an embodiment of the present invention. The pixels encode roughness estimates in meters. Higher roughness is brighter, whereas darker pixels such as 722 are less rough. FIG. 7D illustrates a probability of safety map 730, according to an embodiment of the present invention. Pixels encode safety probability. Higher probabilities are brighter. Safety map 730 is the result of convolution with a Gaussian filter that denotes navigation uncertainty, hence the blurry appearance. Note that benign terrain such as 732 results in a higher safety probability.

Figure 8A:
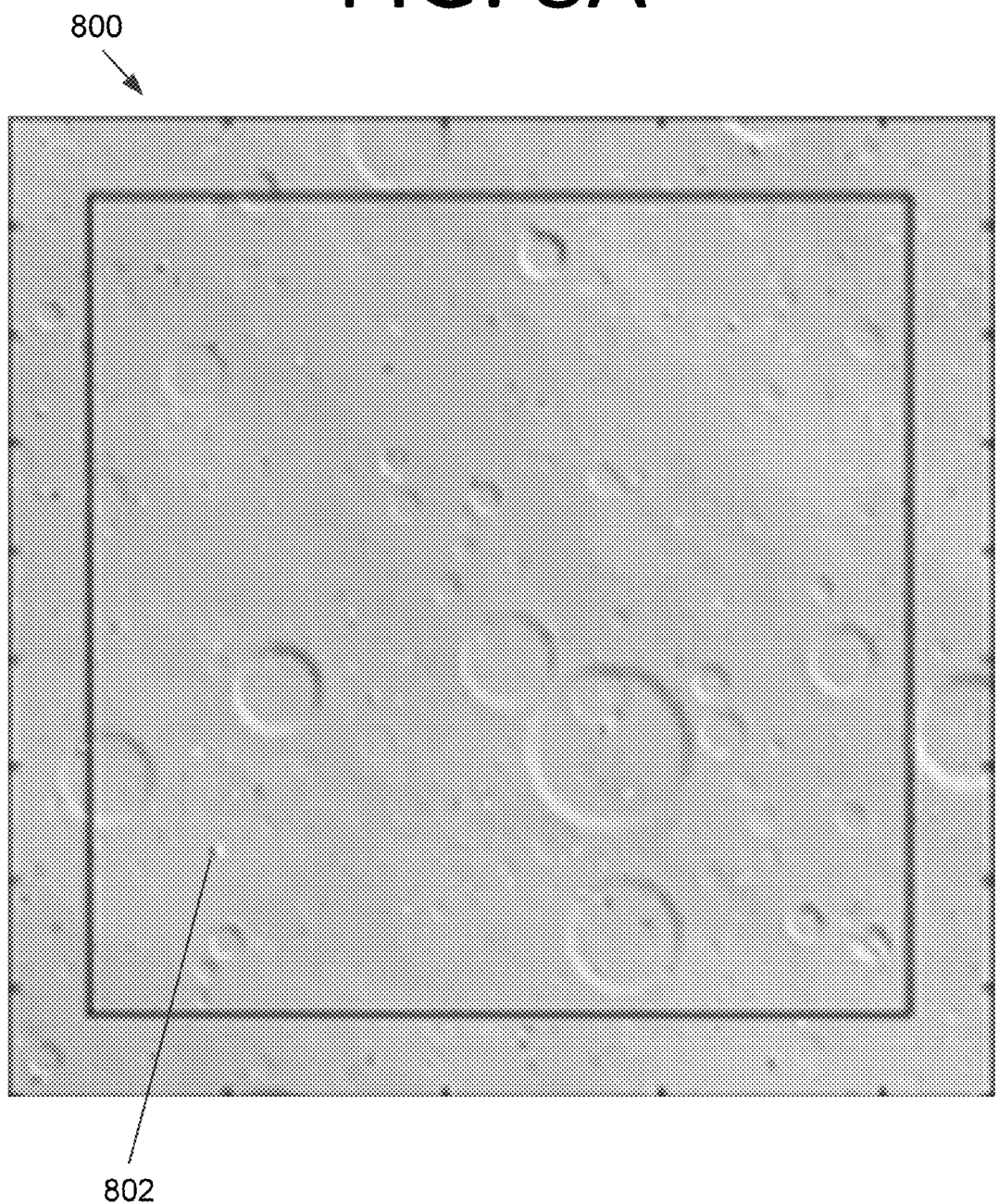
FIG. 8A illustrates a shaded map of the DEM shown in FIG. 7A where the pixels encode surface reflectance when illuminated from the top-right, according to an embodiment of the present invention.
Figure 8B:
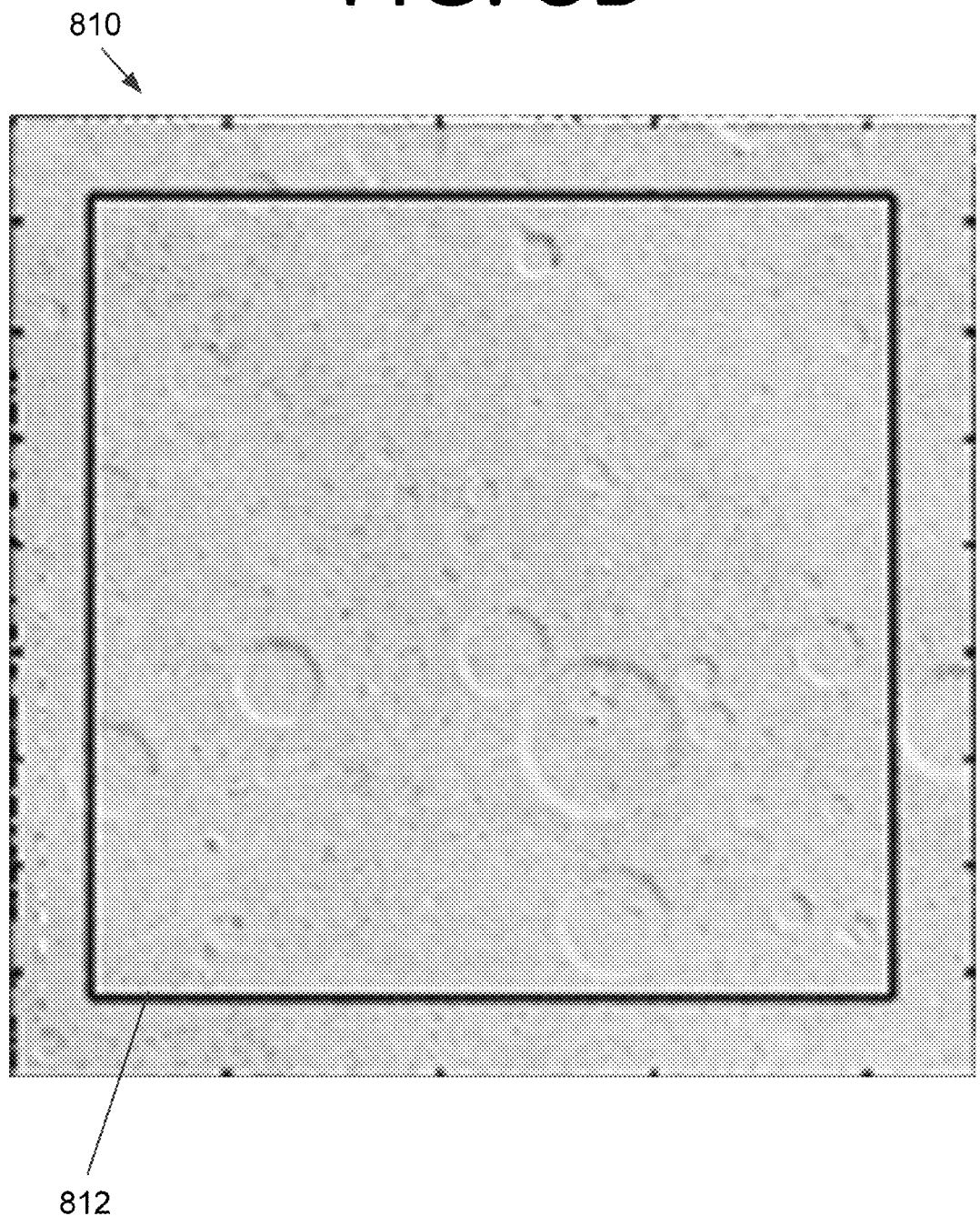
FIG. 8B illustrates a terrain model sensed by a flash lidar with 0.05 m Gaussian noise, according to an embodiment of the present invention.

FIGS. 8A-D illustrate the terrain example in FIG. 7A-D when the terrain is sensed by a lidar sensor producing a noisy DEM. FIG. 8A illustrates the same terrain as in FIG. 7A in a shaded representation 800 as the terrain would appear illuminated from the top right. The embodiment described does not use this map or image, but the map is presented for illustrative purposes to help visualize the topography, crater depths, rocks (such as 802), shadows, etc. FIG. 8B illustrates the sensed, noisy DEM 810 and the effect of 0.05 m Gaussian noise. The edges of the lidar DEM 810 are considered hazardous up to the radius of the lander. Frame 812 denotes the area analyzed—in this example, 75 m×75 m.

Figure 8D:
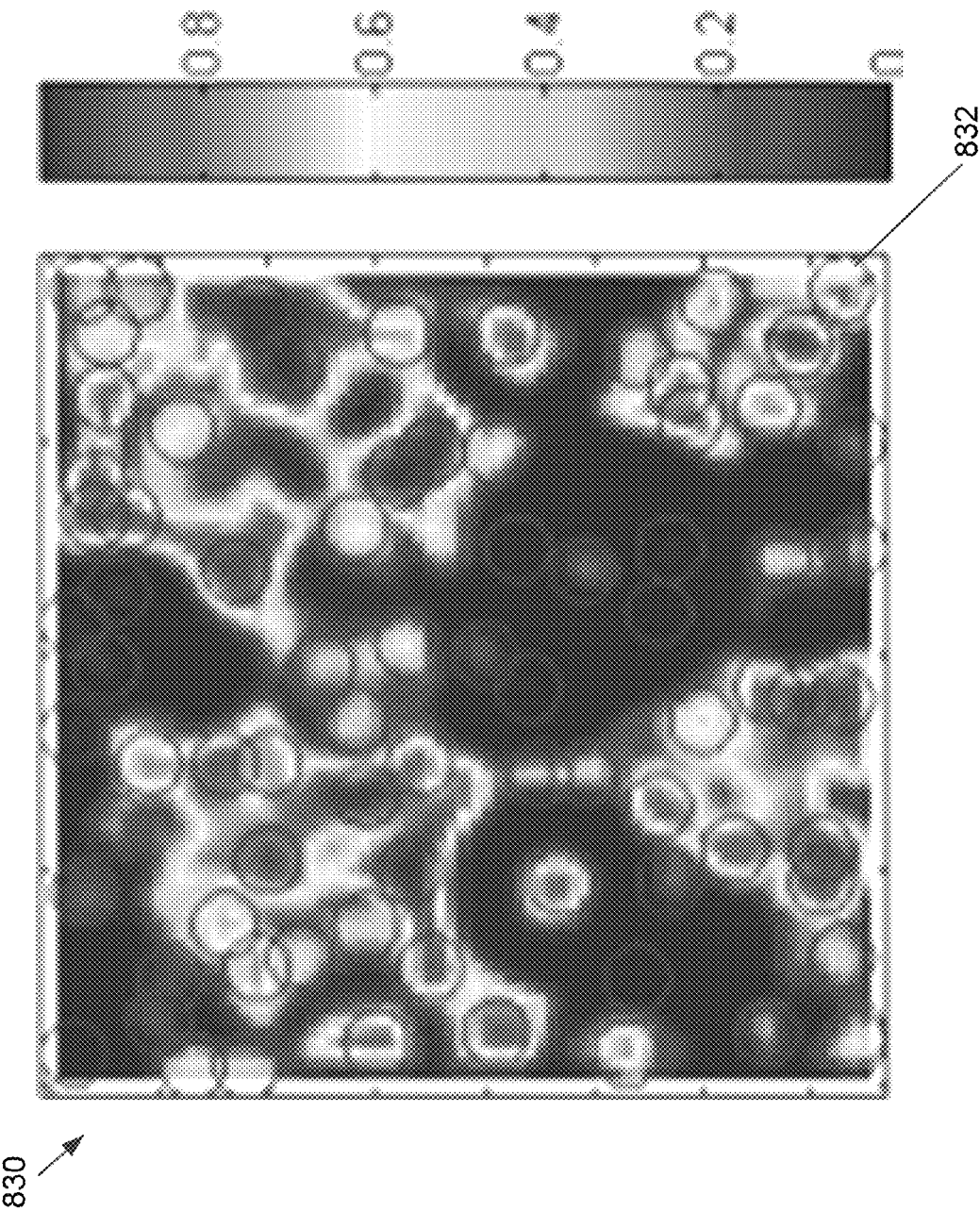
FIG. 8D illustrates a safety probability map with potential landing locations identified where brighter pixels denote safer locations, according to an embodiment of the present invention.

FIG. 8C illustrates a probability of hazard map 820 where only every tenth pixel or aim point has been evaluated. In other words, every meter rather than every 0.1 meter of the resolution of the lidar DEM is evaluated. In this embodiment, the analysis would be completed two orders of magnitude faster, a consideration within the real-time constraints on slower computing equipment or small landers. FIG. 8D illustrates a safety probability map 830. Safer areas are brighter. The site selection algorithm in this embodiment detects the areas containing regional maxima, e.g. regions that contain a peak in the probability map. The entire set of regional maxima is illustrated by circles 832. Different embodiments may request different ways of reporting these locations, e.g. the top two, or five, or ten, ranked by safety probability, or all sites having a safety probability greater than a certain tolerable risk. In other embodiments an operator could manually select a landing site other than the top based on his own observations, fuel budget, etc.

The method steps performed in FIGS. 4-6 may be performed by a computer program, encoding instructions for the nonlinear adaptive processor to perform at least the methods described in FIGS. 4-6, in accordance with an embodiment of the present invention. The computer program may be embodied on a non-transitory computer-readable medium. The computer-readable medium may be, but is not limited to, a hard disk drive, a flash device, a random access memory, a tape, or any other such medium used to store data. The computer program may include encoded instructions for controlling the nonlinear adaptive processor to implement the methods described in FIGS. 4-6, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an application specific integrated circuit ("ASIC").

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. An apparatus configured to implement probabilistic hazard detection and avoidance for landing a craft, comprising:
   a processor and memory for storing digital elevation map data for one or more potential landing sites and computer program instructions, wherein the computer program instructions are configured to cause the processor to:
      assign one or more of a plurality of pixels of said digital elevation map to be one or more landing aim points for the landing craft,
      compute a probability of safe touchdown for one or more of said landing aim points and one or more orientation of the landing craft, said probability of safe touchdown based on measured roughness of pixels surrounding the landing aim point and the orientation of the landing craft; and
      assign a worst case probability value to each of the one or more landing aim points, the worst case probability value being the smallest value of said probability of safe touchdown.

2. The apparatus of claim 1, wherein the computer program instructions are further configured to cause the processor to:
   assign the probability of safe touchdown to one or more landing sites comprising multitude adjacent landing aim points.

3. The apparatus of claim 2, wherein the probability of safe touchdown are computed using a two-dimensional Gaussian kernel and recorded in a probability of safety map.

4. The apparatus of claim 1, wherein landing craft geometry and mechanical hazard tolerances are taken into account in computing the probability of safe touchdown.

5. The apparatus of claim 1, wherein the probability of safe touchdown around the one or more landing aim points are weighted by a probability of deviation due to navigation error to produce a final safety score for a current trajectory.

6. The apparatus of claim 1, wherein the computer program instructions are further configured to cause the processor to: output one or more safe landing sites based on the worst case probability values assigned to the one or more landing aim points to a visual display device for review by a pilot or controller.

7. The apparatus of claim 6, wherein the one or more safe landing sites are displayed in ascending or descending order based on relative safety.

8. The apparatus of claim 1, wherein the computer program instructions are further configured to cause the processor to: engage flight control systems to direct a vehicle comprising the apparatus to one or more safe landing sites based on the worst case probability values assigned to the one or more landing aim points.

9. The apparatus of claim 8, wherein the computer program instructions are further configured to cause the processor to engage the flight control systems to direct the vehicle to the safest landing site.

10. The apparatus of claim 1, wherein the probability of safe touchdown are computed for every possible orientation, and a smallest probability is taken and used as the worst case probability value for each respective landing aim point.

* * * * *